US010417594B2

(12) United States Patent
Lemcke et al.

(10) Patent No.: US 10,417,594 B2
(45) Date of Patent: Sep. 17, 2019

(54) VALIDATION OF FUNCTIONAL CORRECTNESS OF SAM SCHEMAS INCLUDING ACTION CHAINS

(71) Applicants: Jens Lemcke, Karlsruhe (DE); Andreas Friesen, Steinfeld (DE); Piergiorgio Bertoli, Civezzano (IT); Marco Pistore, Trento (IT)

(72) Inventors: Jens Lemcke, Karlsruhe (DE); Andreas Friesen, Steinfeld (DE); Piergiorgio Bertoli, Civezzano (IT); Marco Pistore, Trento (IT)

(73) Assignee: SAP SE, Walldorf (DE)

( * ) Notice: Subject to any disclaimer, the term of this patent is extended or adjusted under 35 U.S.C. 154(b) by 1356 days.

(21) Appl. No.: 13/875,539

(22) Filed: May 2, 2013

(65) Prior Publication Data

US 2014/0330612 A1 Nov. 6, 2014

(51) Int. Cl.
*G06Q 10/06* (2012.01)
(52) U.S. Cl.
CPC ... *G06Q 10/06316* (2013.01); *G06Q 10/0633* (2013.01)
(58) Field of Classification Search
CPC .............. G06Q 10/06316; G06Q 10/0633
USPC ....................................... 705/7.26
See application file for complete search history.

(56) References Cited

U.S. PATENT DOCUMENTS

| | | |
|---|---|---|
| 3,845,286 A | 10/1974 | Aronstein et al. |
| 5,212,792 A | 5/1993 | Gerety et al. |
| 5,295,222 A | 3/1994 | Wadhwa et al. |
| 5,404,496 A | 4/1995 | Burroughs et al. |
| 5,555,415 A | 9/1996 | Allen |
| 5,652,714 A | 7/1997 | Peterson et al. |
| 5,671,360 A | 9/1997 | Hambrick et al. |
| 5,758,029 A | 5/1998 | Hall |

(Continued)

FOREIGN PATENT DOCUMENTS

| | | |
|---|---|---|
| EP | 1674990 A1 | 6/2006 |
| WO | WO2005117549 A3 | 12/2005 |
| WO | WO2008000499 A2 | 1/2008 |

OTHER PUBLICATIONS

Piergiorgio Bertoli et al., S&AM Verification—Formal Framework, Jan. 17, 2011. 14 pgs.*

(Continued)

*Primary Examiner* — Timothy Padot
(74) *Attorney, Agent, or Firm* — Fish & Richardson P.C.

(57) ABSTRACT

Methods, systems, and computer-readable storage media for evaluating a validity of an extended status and action management (SAM) schema. In some implementations, actions include receiving the extended SAM schema, the extended SAM schema being an extension of a core SAM schema, providing one or more goals, goals representing an intention of the core SAM schema, receiving one or more action chains, action chains representing one or more actions of the extended SAM schema that are to be automatically executed, the one or more actions being associated with triggerability flags, a triggerability flag indicating whether a respective action is only triggerable using a respective action chain, and processing the one or more goals, the one or more action chains and the triggerability flags using a computer-executable model checking tool for evaluating the validity of the extended SAM schema.

17 Claims, 10 Drawing Sheets

(56) References Cited

U.S. PATENT DOCUMENTS

| | | | |
|---|---|---|---|
| 5,781,545 A | 7/1998 | Matthew | |
| 5,801,687 A | 9/1998 | Peterson et al. | |
| 5,890,146 A | 3/1999 | Wavish et al. | |
| 5,920,718 A | 7/1999 | Uczekaj et al. | |
| 5,983,016 A | 11/1999 | Brodsky et al. | |
| 5,991,733 A | 11/1999 | Aleia et al. | |
| 6,078,325 A | 6/2000 | Jolissaint et al. | |
| 6,151,023 A | 11/2000 | Chari | |
| 6,175,837 B1 | 1/2001 | Sharma et al. | |
| 6,182,277 B1 | 1/2001 | DeGroot et al. | |
| 6,308,224 B1 | 10/2001 | Leymann et al. | |
| 6,324,496 B1 | 11/2001 | Alur et al. | |
| 6,339,838 B1* | 1/2002 | Weinman, Jr. | G06Q 10/10 717/104 |
| 6,408,262 B1 | 6/2002 | Leerberg et al. | |
| 6,442,515 B1 | 8/2002 | Varma et al. | |
| 6,480,955 B1 | 11/2002 | DeKoning et al. | |
| 6,553,403 B1 | 4/2003 | Jarriel et al. | |
| 6,681,383 B1 | 1/2004 | Pastor et al. | |
| 6,760,733 B1 | 7/2004 | Komine et al. | |
| 6,769,048 B2 | 7/2004 | Goldberg et al. | |
| 6,772,036 B2 | 8/2004 | Eryurek et al. | |
| 6,973,460 B1 | 12/2005 | Mitra | |
| 7,117,293 B1 | 10/2006 | Graziano et al. | |
| 7,120,896 B2 | 10/2006 | Budhiraja et al. | |
| 7,191,149 B1 | 3/2007 | Lanham et al. | |
| 7,437,374 B2 | 10/2008 | Chen et al. | |
| 7,451,447 B1 | 11/2008 | Deshpande | |
| 7,577,681 B1 | 8/2009 | Rozenman et al. | |
| 7,606,791 B2 | 10/2009 | Dettinger et al. | |
| 7,613,993 B1 | 11/2009 | Baer et al. | |
| 7,617,483 B2 | 11/2009 | Vigelius et al. | |
| 7,761,337 B2 | 7/2010 | Caballero et al. | |
| 7,797,708 B2 | 9/2010 | Weber et al. | |
| 8,020,172 B2 | 9/2011 | Kraft et al. | |
| 8,055,527 B1 | 11/2011 | Gil et al. | |
| 8,200,715 B1 | 6/2012 | Kraft et al. | |
| 8,219,650 B2 | 7/2012 | Krasinskiy et al. | |
| 8,386,996 B2 | 2/2013 | Prigge et al. | |
| 8,515,794 B2 | 8/2013 | Duparc et al. | |
| 8,521,621 B1 | 8/2013 | Hetzer et al. | |
| 8,522,261 B2 | 8/2013 | Kraft et al. | |
| 8,526,743 B1 | 9/2013 | Campbell et al. | |
| 8,527,517 B1 | 9/2013 | Ait-Mokhtar | |
| 8,601,490 B2 | 12/2013 | Sureshan et al. | |
| 8,645,228 B2 | 2/2014 | Moussa et al. | |
| 8,694,557 B2 | 4/2014 | Thimmel et al. | |
| 8,706,776 B1 | 4/2014 | Kraft et al. | |
| 2002/0013777 A1 | 1/2002 | Diener | |
| 2002/0038206 A1 | 3/2002 | Dori | |
| 2002/0062475 A1 | 5/2002 | Iborra et al. | |
| 2002/0083413 A1 | 6/2002 | Kodosky et al. | |
| 2002/0138290 A1 | 9/2002 | Metcalfe et al. | |
| 2002/0152102 A1 | 10/2002 | Brodersen et al. | |
| 2002/0167544 A1 | 11/2002 | Raghavan et al. | |
| 2002/0194388 A1 | 12/2002 | Boloker et al. | |
| 2003/0018461 A1 | 1/2003 | Beer et al. | |
| 2003/0018508 A1 | 1/2003 | Schwanke | |
| 2003/0028858 A1 | 2/2003 | Hines | |
| 2003/0046658 A1 | 3/2003 | Raghavan et al. | |
| 2003/0050813 A1 | 3/2003 | Cohen et al. | |
| 2003/0074090 A1 | 4/2003 | Becka et al. | |
| 2003/0074371 A1 | 4/2003 | Park et al. | |
| 2003/0195789 A1 | 10/2003 | Yen | |
| 2004/0027388 A1 | 2/2004 | Berg et al. | |
| 2004/0049436 A1 | 3/2004 | Brand et al. | |
| 2004/0059808 A1 | 3/2004 | Galloway et al. | |
| 2004/0078258 A1 | 4/2004 | Schulz et al. | |
| 2004/0083448 A1 | 4/2004 | Schulz et al. | |
| 2004/0139104 A1 | 7/2004 | Kuntz et al. | |
| 2004/0181775 A1 | 9/2004 | Anonsen et al. | |
| 2004/0193510 A1 | 9/2004 | Catahan et al. | |
| 2004/0220956 A1 | 11/2004 | Dillon | |
| 2004/0225919 A1 | 11/2004 | Reissman et al. | |
| 2004/0233232 A1 | 11/2004 | Iborra et al. | |
| 2005/0004888 A1 | 1/2005 | McCrady et al. | |
| 2005/0004951 A1 | 1/2005 | Ciaramitaro et al. | |
| 2005/0010504 A1 | 1/2005 | Gebhard et al. | |
| 2005/0137928 A1 | 6/2005 | Scholl et al. | |
| 2006/0069605 A1 | 3/2006 | Hatoun | |
| 2006/0085681 A1 | 4/2006 | Feldstein et al. | |
| 2006/0095439 A1 | 5/2006 | Buchmann et al. | |
| 2006/0136923 A1 | 6/2006 | Kahn et al. | |
| 2006/0179383 A1 | 8/2006 | Blass et al. | |
| 2006/0227350 A1 | 10/2006 | Crawford et al. | |
| 2006/0265691 A1 | 11/2006 | Klinger et al. | |
| 2006/0294158 A1 | 12/2006 | Tsyganskiy et al. | |
| 2007/0094248 A1* | 4/2007 | McVeigh | G06F 16/958 |
| 2007/0142935 A1 | 6/2007 | Danielsson et al. | |
| 2007/0156427 A1 | 7/2007 | Dentzer et al. | |
| 2007/0226025 A1 | 9/2007 | Chang et al. | |
| 2007/0240168 A1 | 10/2007 | Guschina et al. | |
| 2007/0250766 A1 | 10/2007 | Medi et al. | |
| 2007/0282570 A1 | 12/2007 | Thompson et al. | |
| 2007/0282916 A1 | 12/2007 | Albahari et al. | |
| 2008/0005061 A1 | 1/2008 | Kraft et al. | |
| 2008/0005152 A1 | 1/2008 | Kraft et al. | |
| 2008/0005153 A1 | 1/2008 | Kraft et al. | |
| 2008/0005162 A1 | 1/2008 | Kraft et al. | |
| 2008/0005625 A1 | 1/2008 | Kraft et al. | |
| 2008/0005739 A1 | 1/2008 | Sadiq et al. | |
| 2008/0005743 A1 | 1/2008 | Kraft et al. | |
| 2008/0005747 A1 | 1/2008 | Meyer et al. | |
| 2008/0015883 A1 | 1/2008 | Hermann | |
| 2008/0046453 A1 | 2/2008 | Kostoulas et al. | |
| 2008/0046862 A1 | 2/2008 | Sattler et al. | |
| 2008/0097990 A1 | 4/2008 | Mustafa | |
| 2008/0162672 A1 | 7/2008 | Krasinskiy et al. | |
| 2008/0164908 A1 | 7/2008 | Challenger et al. | |
| 2008/0313212 A1 | 12/2008 | Yu et al. | |
| 2009/0006150 A1 | 1/2009 | Prigge et al. | |
| 2009/0006943 A1 | 1/2009 | Matheson et al. | |
| 2009/0007056 A1* | 1/2009 | Prigge | G06Q 10/10 717/104 |
| 2009/0063370 A1* | 3/2009 | Friesen | G06F 8/20 706/10 |
| 2009/0089309 A1 | 4/2009 | Thimmel et al. | |
| 2010/0082696 A1* | 4/2010 | Cao | G06Q 10/063 707/802 |
| 2010/0100518 A1 | 4/2010 | Andrade et al. | |
| 2010/0161676 A1 | 6/2010 | Kazmaier et al. | |
| 2010/0262902 A1 | 10/2010 | Burns | |
| 2011/0161926 A1 | 6/2011 | Cruise et al. | |
| 2011/0179088 A1 | 7/2011 | Medi et al. | |
| 2013/0275389 A1 | 10/2013 | Lemcke et al. | |
| 2014/0006291 A1 | 1/2014 | Buecheler et al. | |
| 2014/0040217 A1 | 2/2014 | Lemcke et al. | |
| 2014/0058905 A1 | 2/2014 | Kahn et al. | |

OTHER PUBLICATIONS

Artificial Intelligence; Data on Artificial Intelligence Discussed by Researchers at NICTA. Computers, Networks & Communications (Sep. 13, 2012): 1527.*

'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.

'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.

Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.

'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.

'Workflow Management Coalition The Workflow Reference Model' [online]. Workflow Management Coalition, 1995, [retrieved on

(56) References Cited

OTHER PUBLICATIONS

Nov. 27, 2006]. Retrieved from the Internet: <URL: www.wfmc. org/standards/docs/tc003v11.pdf>, 55 pages.

'Introduction to OMG's Unified Modeling Language TM (UML®)' [online]. Object Management Group, 2005 [retrieved Nov. 26, 2006]. Retrieved from the Internet: <URL: omg.org/gettingstarted/ what_is_uml.htm>, 16 pages.

Leavens, Gary T. et al., "Preliminary Design of JML: A Behavioral Interface Specification Language of Java," ACM SIGSOFT Software Engineering Notes, vol. 31, No. 3, May 2006, pp. 1-38.

Kiczales, Gregor et al., "An Overview of AspectJ," Lecture notes in Computer Science, Springer Verlag, Berlin, Germany, vol. 2072, Jun. 18, 2001, pp. 327-353.

Jason Zhicheng Li, "Business Object State Management Using State Machine Compiler," Internet Citation, May 1, 2006 (May 2, 2006), XP002396380, Retrieved from the internet: http://today.java. ne/pub/a/today/2006 /01/05/business-object-state management-using-smc.html, retrieved Aug. 24, 2006. 8 pages.

Eric Armstrong, "How to implement state-dependent behavior—Doing the State pattern in Java," Internet citation, XP002246628 ISSN: 1091-8906, Retrieved from the internet: http://222.javaworld. com/javaworld/jw-08-1997/jw-08-stated_p.html, retrieved on Jul. 7, 2003, 5 pages.

W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.

Lohman et al., "Behavioral Contraints for Services", Business Process Management, 5th International Conference, BPM, 2007, Brisbane, Australia, 16 pages.

Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001, 327 pages.

Beugnard et al., "Making Components Contract Aware", IEEE Computer Society, Jul. 1999, pp. 38-45.

Wirtz et al., "The OCoN Approach to Workflow Modeling in Object-Oriented Systems", Information Systems Frontiers 3:3, 357-376, 2001.

"Unified Modeling Language: Superstructure", Version 2.0, formal/Jul. 4, 2005, Object Management Group, Aug. 2005, 694 pages.

"Unified Modeling Language: Superstructure", Version 2.1.1 (non-change bar), formal/Jul. 2, 2005, Object Management Group, Feb. 2007, 716 pages.

"Object Constraint Language", OMG Available Specification, Version 2.0, formal/Jun. 5, 2001, Object Management Group, May 2006, 232 pages.

Baldan et al., "Functorial Concurrent Semantics for Petri Nets and Read and Inhibitor Arcs", Lecture Notes in Computer Science, vol. 1877, Proceedings of the 11th International Conference on Concurrency Theory, Springer-Verlag, 2000, 15 pages.

"Business Process Modeling Notation Specification", Final Adopted Specification, dtc/Jun. 2, 2001, Object Management Group, Feb. 2006, 284 pages.

S. Christensen and N. Hansen, "Coloured Petri Nets Extended with Place Capacities, Test Arcs and Inhibitor Arcs", Lecture Notes in Computer Science, vol. 691, Proceedings of the 14th International Conference on Application and Theory of Petri Nets, Springer-Verlag, 1993, 21 pages.

S. Stelting et al., "Applied Java Patterns" (Online), Dec. 26, 2001, Prentice Hall, retrieved from the internet: http://proquest. safaribooksonline.com/0130935387?tocview=true>, retrieved Aug. 7, 2009), 11 pages.

International Search Report and Written Opinion of the International Searching Authority dated Nov. 30, 2007, in corresponding application PCT/ EP2007/005785.

International Search Report and Written Opinion of the International Searching Authority issued in PCT/EP2007/005783 dated Jan. 7, 2009, 14 pages.

International Search Report and Written Opinion of the International Searching Authority issued in PCT/EP2007/005779 dated Dec. 30, 2008, 14 pages.

International Search Report and Written Opinion of the International Searching Authority issued in PCT/EP2007/005782 dated Dec. 30, 2008, 14 pages.

International Search Report and Written Opinion of the International Searching Authority issued in PCT/EP2007/005786 dated Jan. 8, 2009, 15 pages.

International Search Report and Written Opinion of the International Searching Authority issued in PCT/EP2007/005784 dated Dec. 29, 2008, 11pages.

International Search Report and Written Opinion of the International Searching Authority issued in PCT/EP2007/005781 dated Dec. 30, 2008, 15 pages.

Extended European Search Report issued in 07025131.9-1243 / 1939744 dated Aug. 19, 2009, 5 pages.

Merriam-Webster Online, "Programmatically—Definition and More from the Free Merriam Webster" downloaded Jun. 16, 2010, http:// www.merriam-webster.com/dictionary/programmatically, 2 pages.

"Unified Modeling Language: Infrastructure", Version 2.1.1 (without change bars), formal/Jul. 2, 2006, Object Management Group, Feb. 2007, 220 pages.

Egon Börger et al., "A Method for Verifiable and Validatable Business Process Modeling," Advances in Software Engineering, Lecture Notes in Computer Science 5316, 2008, pp. 59-115.

Farhana H. Zulkernine et al., "A Constraint-Driven Business Object Model for Service-Based Business Processes," Proceedings of the Ninth International Conference on Information Technology—New Generations, ITNG'12, Apr. 2012, pp. 182-188.

Object Management Group (OMG), "Business Process Modeling Notation, V1.1", Jan. 17, 2008, 318 pages.

Nathan S. Caswell et al., "Agility=Change+Coordination," Proceedings of the Seventh IEEE International Conference on E-Commerce Technology Workshops, CECW 2005, Jul. 2005, pp. 131-139.

DOT Language and Graphviz Graph Processing Tools [online], retrieved on Nov. 21, 2012 from http://www.graphviz.org, 3 pages.

Carsten Hentrich et al., "Patterns for Business Object Model Integration in Process-Driven and Service-Oriented Architectures," Proceedings of the Pattern Languages of Programs (PLoP '06), Oct. 2006, 14 pages.

IBM, "Service Data Objects, WorkManager, and Timers: IBM and BEA Joint Specifications Overview," Nov. 30, 2005, retrieved from http://www.ibm.com/developerworks/library/specification/j-commonj-sdowmt/index.html, 3 pages.

Chris Kanaracus, "Business Objects bets on convergence in IT tools" InfoWorld, Aug. 12, 2008, http://www.infoworld.com/d/ security-central/business-objects-bets-convergence-in-it-tools-699, 2 pages.

Prabir Nandi et al., "Adaptive Business Objects—A New Component Model for Business Integration," Proceedings of the 7th International Conference on Enterprise Information Systems, ICEIS 2005, May 2005, pp. 179-188.

Quyen L. Nguyen et al., Agile Business Objects Management Application for Electronic Records Archive Transfer Process. Proceedings of the Balisage: The Markup Conference, Aug. 2009, 16 pages.

NuSMV: A symbolic model checker [online], retrieved on Nov. 21, 2012 from http://nusmv.fbk.eu, 4 pages.

Oasis, "Web Services Business Process Execution Language Version 2.0," Public Review Draft 02, Nov. 2006, pp. 282.

Marco Pistore et al., "A Minimalist Approach to Semantic Annotations for Web Processes Compositions," Proceedings of the 3rd European Semantic Web Conference , ESWC'06, Jun. 2006, Lecture Notes in Computer Science 4011, pp. 620-634.

Karsten Riemer, "A Process-Driven, Event-Based Business Object Model," Proceedings of the Second International Enterprise Distributed Object Computing Workshop, EDOC '98, Nov. 1998, pp. 68-74.

(56) References Cited

OTHER PUBLICATIONS

Dumitru Roman et al., "Web Service Modeling Ontology," Applied Ontology, vol. 1, 2005, pp. 77-106.
Oumaima Saidani et al., "A Role-Based Approach for Modeling Flexible Business Processes," Proceedings of the Workshop on Business Process Modeling, Development, and Support (BPMDS'06) in association with CAiSE'06, Jun. 2006, pp. 111-120.
John Beatty et al., "Next-Generation Data Programming: Service Data Objects," A Joint Whitepaper with IBM and BEA, Nov. 2003, 15 pages.
Piergiorgio Bertoli et al., S&AM Verification—Formal Framework, Jan. 17, 2011, 14 pages.
Frank Michael Kraft et al., U.S. Appl. No. 12/634,834, entitled "Extending Status Models in a Computer System," filed Dec. 10, 2009 (including specification, claims, abstract and drawings).
Frank Michael Kraft et al., U.S. Appl. No. 12/634,996, entitled "Using Status Models with Adaptable Process Steps in a Computer System," filed Dec. 10, 2009 (including specification, claims, abstract and drawings).
Alessandro Cimatti, et al., "NuSMV 2: An OpenSource Tool for Symbolic Model Checking". In Proceeding of International Conference on Computer-Aided Verification (CAV 2002). Copenhagen, Denmark, Jul. 27-31, 2002, 9 pages.

\* cited by examiner

VALIDATION OF FUNCTIONAL CORRECTNESS OF SAM SCHEMAS INCLUDING ACTION CHAINS

BACKGROUND

Businesses are increasingly service-driven, where a service can, for example, represent a part of or a complete business process. In some examples, the business process depicts the lifecycle of a business object (BO). A number of actions constrained by a set of business policies can result in the BO transitioning from an initial state to a final state during its lifecycle. Constraints can vary for different customized business processes. The validity of a business process can depend on the ability of a BO to reach an acceptable state.

SUMMARY

Implementations of the present disclosure include computer-implemented methods for evaluating a validity of an extended status and action management (SAM) schema. In some implementations, actions include receiving the extended SAM schema, the extended SAM schema being stored as a computer-readable document in memory and being an extension of a core SAM schema, providing one or more goals, goals representing an intention of the core SAM schema, the one or more goals being provided in a computer-readable document stored in memory, receiving one or more action chains, action chains representing one or more actions of the extended SAM schema that are to be automatically executed, the one or more action chains being provided in a computer-readable document stored in memory, the one or more actions being associated with triggerability flags, a triggerability flag indicating whether a respective action is only triggerable using a respective action chain, and processing the one or more goals, the one or more action chains and the triggerability flags using a computer-executable model checking tool for evaluating the validity of the extended SAM schema.

In some implementations, actions further include providing an extended finite state machine (FSM) based on the extended SAM schema, the extended FSM representing states of the extended SAM schema and transitions between states, the extended FSM being provided as a computer-readable document and being stored in memory, wherein processing further includes processing the extended FSM.

In some implementations, processing the extended FSM, the one or more goals, the one or more action chains and the triggerability flags includes generating one or more traces, each trace defining a path of status vectors and actions that are possible through the extended SAM schema.

In some implementations, processing the extended FSM, the one or more goals, the one or more action chains and the triggerability flags further includes determining that at least one goal does not appear in any trace and, in response, indicating that at least one action chain of the one or more action chains is invalid, the at least one action chain including actions executable to achieve the at least one goal.

In some implementations, processing the extended FSM, the one or more goals and the one or more action chains further includes determining that no goal of at least one goal group appears in any trace and, in response, indicating that at least one action chain of the one or more action chains is invalid, the at least one action chain including actions executable to achieve the one or more goals in the at least one goal group.

In some implementations, processing the extended FSM, the one or more goals and the one or more action chains further includes determining that no goal of at least one primary goal group appears in any trace and, in response, indicating that at least one action chain of the one or more action chains is invalid, the at least one action chain including actions executable to achieve the one or more goals in the at least one primary goal group.

In some implementations, each state is associated with a status vector, the status vector being defined as a ordered set of variable values.

In some implementations, each transition is associated with an action that can be performed to change a status vector.

In some implementations, the extended SAM schema represents constraints on actions that can be performed to transition between states.

In some implementations, each action chain of the one or more action chains includes one of a hard action chain, a soft action chain, and a mixed action chain.

In some implementations, at least one action chain includes at least one hard action and at least one soft action.

In some implementations, a hard action includes an action that, if disallowed, results in halting execution of another action or logic in the at least one action chain.

In some implementations, a soft action includes an action that, even if disallowed, execution of another action or logic in the at least one action chain continues.

In some implementations, the process includes a business process.

In some implementations, the extended SAM schema is provided based on a business object (BO) extension that points to a core BO, the BO extension including business object node (BON) extensions, each BON extension pointing to a respective BON of the core BO.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
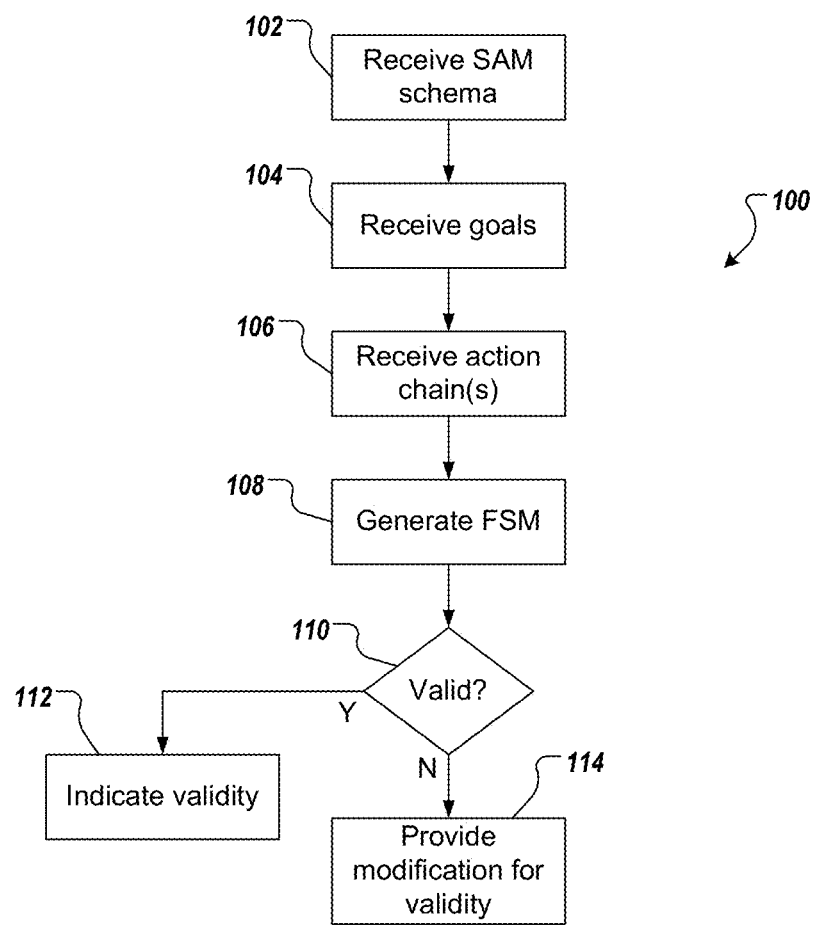
FIG. 1 depicts an example process in accordance with implementations of the present disclosure.

Implementations of the present disclosure are generally directed to modeling action chains of a business process that is expressed in a status and action management (SAM) schema, and validating an extension to the SAM schema (e.g., an extended SAM schema) in view of the action chains. In some examples, extensions of SAM schemas can result in broken action chains. In some examples, broken action chains must be compensated for by an extender (e.g., the entity/person extending the SAM schema). For example, compensation can include providing a new action chain.

In accordance with implementations of the present disclosure, an action chain model is provided to increase transparency and assist the extender in providing an extended SAM schema. More particularly, transparency is provided to an extender of SAM schemas, and enables extenders to adapt and/or compensate actions in the action chains to ensure validity of the extended SAM schema. In some examples, formalization of action chains enables formal analysis using verification techniques. Implementations of the present disclosure further provide verification services defined upon the action chain models and SAM schemas that provide effective and powerful assistance supporting the extender in their tasks.

In some implementations, intentions of the business process can be modeled as one or more states. In some examples, a core SAM schema is provided and includes one or more states that are achievable, and one or more action chains that can be provided to move between states. A core finite state machine (FSM) is provided based on the core SAM schema. Validity of the one or more action chains, and achievement of the one or more states is validated against the core FSM to determine whether the core SAM schema, and thus an underlying core business process, correctly fulfills the intentions for which the business process is provided. An extended SAM schema is provided based on the core SAM schema. An extended FSM is provided based on the extended SAM schema. The extended SAM schema and the action chains are validated against the one or more states to determine whether an underlying extended business process correctly fulfills the intentions for which the core business process is provided.

In some implementations, goals can include achievable states defined as respective state vectors, discussed in further detail herein. In some examples, the extended SAM schema is valid if all of the goals can be achieved and the action chains are valid. In some implementations, goal groups can be defined, each goal group including one or more goals defined as respective state vectors. In some examples, the extended SAM schema is valid if a goal in each of the goal groups is achievable, and the action chains are valid. In some implementations, goal groups can be classified as primary goals or recovery goals, discussed in further detail herein. In some examples, the extended SAM schema is valid if the extended SAM schema can reach at least one goal in goal groups classified as primary goals, and the action chains are valid.

FIG. 1 depicts an example process 100 in accordance with implementations of the present disclosure. In some implementations, the example process 100 can be provided using one or more computer programs that are executed using one or more computing devices.

An extended SAM schema is received (102). In some examples, the extended SAM schema can be provided as a computer-readable document that is received from computer-readable memory. For example, the extended SAM schema can be provided in a machine-readable specification language, discussed in further detail herein. For example, the extended SAM schema is provided based on an extension applied to the core SAM schema. Goals are received (104). In some examples, the goals include goals associated with a core SAM schema underlying the extended SAM schema. In some examples, goal groups are provided. In some examples, goal groups are classified as primary goals or recovery goals. One or more action chains are received (106). In some examples, the one or more action chains can be provided as a computer-readable document that is received from computer-readable memory. In some examples, one or more actions are associated with triggerability flags, a triggerability flag indicating whether a respective action is only triggerable using a respective action chain. In some examples, the one or more action chains are provided in an action chain model. In some examples, the one or more action chains include action chains that are valid for the core SAM schema. An extended FSM is generated (108). In some examples, the extended FSM is generated based on the extended SAM schema and can be provided as computer program code. Validity of the core SAM schema is verified based on the core FSM in view of the one or more goals and the one or more action chains (114). In some examples, the extended FSM, the one or more goals and the one or more action chains are provided to a computer-executable model checking tool as respective computer-readable documents. The computer-executable model checking tool processes the extended FSM, the one or more goals and the one or more action chains, as discussed in further detail herein, to determine a validity of the extended SAM schema. If it is determined that the extended SAM schema is valid, validity is indicated (112). For example, validity of the extended SAM schema can be visually indicated by the model checking tool. If it is determined that the extended SAM schema is invalid, invalidity can be indicated and a modification (e.g., adding an action chain) can be provided, which would make the extended SAM schema valid (114).

In general, SAM schemas provide a consistent approach to status modeling and implementation activities of data objects (e.g., a business object (BO), or business object node (BON)). More particularly, a SAM schema can be defined at design-time and can be provided as a schema model that is stored in computer-readable medium. The SAM schema includes preconditions for performing actions with each precondition identifying how a status affects whether an action is allowed to be performed at runtime by a data object node instance having the status. A status schema instance is created for a particular object node instance that is used in a computer-based process. The status schema instance corresponds to the status schema model.

In some examples, one or more BOs can be associated with a business process and can be manipulated during execution of the business process. In some examples, manipulation of a BO can result in the BO transitioning from one status to another status. In some examples, a BO is provided as a hierarchical structure of BO nodes (BONs). In some examples, BON can correspond to a header of the BO, and one or more BONs can correspond to respective one or more items that make up the BO. As used herein, reference to a SAM schema of a BO can indicate a SAM schema of a BON (e.g., the SAM schema can refer to a header or an item of a BO, or the BO itself, as applicable).

In some examples, during execution of a business process, a method that changes attribute values of the BO can be executed. Consequently, the BO (e.g., a BON of the BO) can transition from one status to another status. In some examples, a status can be defined as the combination of the current attribute values of a BON at a given point in time. In some examples, a status of the BO can be defined based on the respective statuses of the BONs that make up the BO. In some examples, an attribute of BON can be classified into categories. Example categories can include standard attributes (e.g., a customer name) and status variables. In some examples, status variables are additional attributes that describe milestones in a lifecycle of the BON. Status variables can provide an aggregated and interpreted view of the status of the BON. In some examples, the status of a BON can be defined based on the values of the status variables at a given point in time. In some examples, the status can be provided as a BO attribute and a modeled entity of SAM that represents the lifecycle of a BON (the result of a processing step). Consequently, a status variable specifies a certain milestone in the lifecycle of a BON (e.g., "order confirmed"). In terms of the business process, this status is indicative of the current status of the business process. Accordingly, a status is a named result of a process step within the business process that is a precondition for a following process step.

During the lifecycle of a BO, the BO can enter various statuses. In order to change a status, an action can be performed on the BO. In some examples, it is not desirable to enable state changes from any status to any other status and/or to enable actions with any status as a precondition for a state change. Consequently, the SAM schema refines a BO (BON) model, discussed in further detail below, in terms of a constraint-based model that governs the lifecycle of the BO (BON). In some examples, the SAM schema is intended to define all possible statuses of a BON, possible actions that can be performed on the BON, the resulting statuses, and preconditions in terms of statuses that have to be reached to perform a certain action. In other words, the SAM schema provides a constraint-based model that defines constraints between statuses and actions. Consequently, the SAM schema is a status schema model type. In some examples, a status schema includes the status variables of a BON, the possible status transitions to the values of these status variables (i.e., triggered by actions) and of preconditions that guard changes to the status variables. At design time, for a given BON, various status schemas can be defined and, when the BON is initialized, one of the status schemas is selected and loaded into the runtime. During runtime (e.g., execution of the modeled process), status changes of a BO occur as they are modeled. Consequently, it can be ensured that no changes other than modeled changes occur and required changes actually do occur. In order to do so, the SAM schema (constructed during the design time) is loaded and evaluated at runtime. Accordingly, a SAM schema describes the expected runtime behavior of a BON in a certain business context and represents the relationship between the status of a BON and its actions, and actual variable values provided during runtime can be compared to the SAM schema to ensure the modeled process is executed as expected.

In summary, a status schema can include multiple elements. Example elements include the multi-valued status variables, the actions, and edges that define a relationship between a status value and an action. As discussed above, the status variables and the corresponding values represent the status of a BON, where a status variable contains multiple possible status values. At runtime, every status variable will have exactly one of the possible status values at any given time. The actions represent the methods that can be performed on the BON. For any given action, whether the action is allowed to be performed can depend on the current status of the BON. The edges represent preconditions that connect status values with actions. The preconditions provide that the actions can only be executed if the status variables have certain required values. However, preconditions do not lead to automatic execution of the corresponding actions (i.e., just because a precondition for a particular action is fulfilled, the particular action is not automatically executed). In some examples, if an action that is allowed by the preconditions is called, the action changes the state of the BO and executes exactly one of possibly several status transitions that originate therefrom. In some examples, edges can be provided between one status value of one variable to another status value of another variable, indicating that one status update directly triggers another status update (e.g., synchronizing).

In some implementations, example elements of a status schema can include advanced modeling elements. In some examples, advanced modeling elements can extend simple SAM modeling. By way of non-limiting example, an advanced modeling element can enable creation of a header status by aggregating various item status values.

Intentions of the business process can be modeled as one or more goals. In some examples, and as discussed in further detail herein, goals can be provided in terms of respective status vectors. In some examples, goals can be grouped into one or more groups. In some examples, and as discussed in further detail herein, each goal group can be represented using wildcards and/or logic operators. In some examples, a goal group can be provided as a tuple of status values (optionally including wildcard(s) and/or logic operator(s)) that achieve a goal of the business process (i.e., a desired outcome).

In some examples, goal groups can correspond to, or be classified as primary goals and recovery goals. In some examples, the primary goals and the recovery goals reflect the intention behind building the SAM schema (e.g., the purpose of the SAM schema). Each of the primary goals and the recovery goals can be represented as a set of status vectors. In some examples, and as discussed in further detail herein, each of the primary goals and the recovery goals can be further represented using wildcards and/or logic operators. In some examples, a primary goal can be provided as a tuple of status values (optionally including wildcard(s) and/or logic operator(s)) that achieve a goal of the business process (i.e., a desired outcome). In some examples, a recovery goal can be provided as a tuple of status values (optionally including wildcard(s) and/or logic operator(s)) that achieve an acceptable goal of the business process (i.e., an acceptable outcome). In some examples, a goal can be intermediate to achieving an end goal of the business process. Examples are discussed in further detail below.

A FSM can be generated based on the SAM schema. In some implementations, the FSM includes nodes and edges between nodes. In the following, we refer to nodes without incoming edges as root nodes, we refer to nodes without outgoing edges as leaf nodes, and we refer to all other nodes as intermediary nodes. In some examples, a root node of the FSM can represent an initial status (e.g., of a BON) and arbitrary nodes can represent final outcomes of status transitions (i.e., goals, goal groups). Nodes on a trace between an initial status and a goal that are neither initial status nor goal can each represent an intermediate status (e.g., of the BON) between the initial status and the goals. Edges between nodes can represent actions that can be performed to transition from one status to another status.

As discussed in further detail herein, the FSM can be processed to determine whether the SAM schema correctly fulfills the intentions under which the SAM schema was built (i.e., the SAM schema meets its goal, action chains associated with the SAM schema are valid).

Implementations of the present disclosure are discussed in further detail herein with reference to an example context. The example context includes a service-based business processes, invoice processing in particular. It is appreciated, however, that implementations of the present disclosure are applicable to other contexts.

In the evolving world of service-based business processes, there is an increasing demand on customizability and reliability. A service can be perceived as a part of or a complete business process. A service can be composed of a series of atomic actions that perform small tasks. The actions can move a BO from one state, or status, to another status. In some examples, the BO can be an electronic document representing a product in supply-chain management or an item of sale in an online store. In some examples, status changes can occur by executing an action during the business process. A number of possible goals in such business processes can be defined by some final states (e.g., product shipped, order cancelled). Executability of the actions and firing of the events are constrained or guided by strict business rules, which can vary for different customers.

Figure 2B:
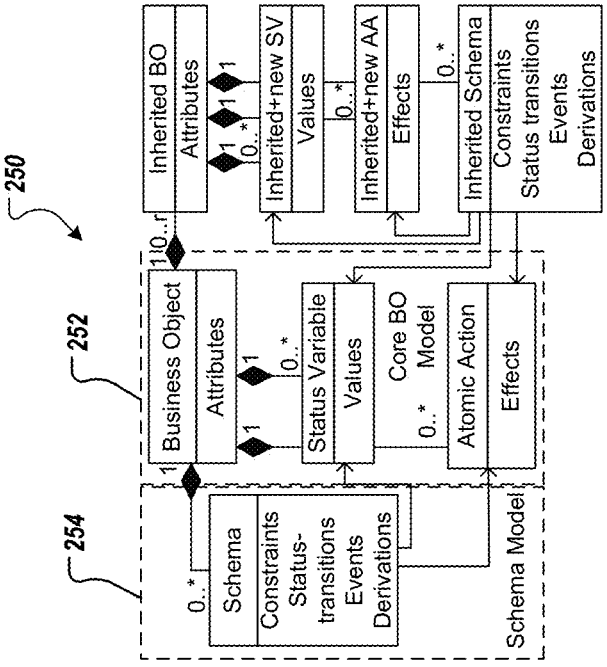
FIG. 2B depicts an example object model.
Figure 2A:
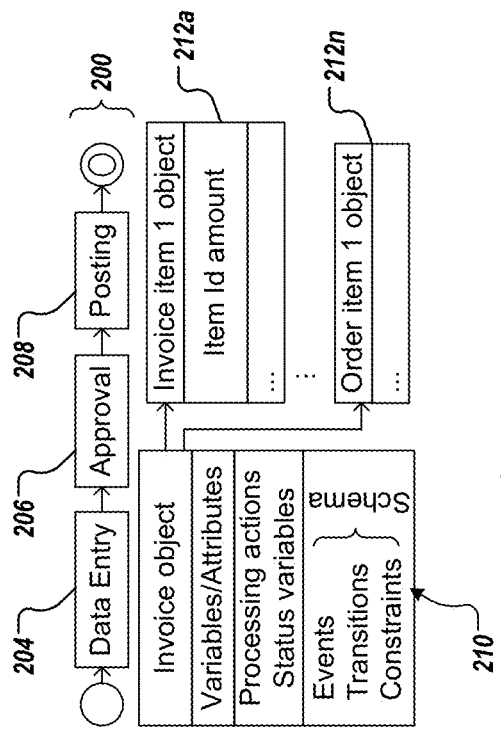
FIG. 2A depicts an example context within which implementations of the present disclosure can be applied.

FIG. 2A depicts an example context within which implementations of the present disclosure can be applied. The example context includes a service-based business process, an invoicing process 200, in particular. The example invoicing process 200 includes a data entry sub-process 204, an approval sub-process 206 and a posting sub-process 208. In the examples context, an invoice object 210 (i.e., invoice BO) is provided and is linked to multiple invoice objects 212a-212n. Actions are provided and are controlled by business constraints, as discussed in further detail below with reference to FIG. 3. Each action can move the invoice object 210 through the data entry sub-process 204, the approval sub-process 206 and the posting sub-process 208.

At any point in the invoicing process 200, the status of a BO is defined by a set of status variables. In the example context, an example status variable can be provided as Data_Entry. Potential values of the Data_Entry status variable within the data entry sub-process 204 can include "finished" and "in process." An example action that can cause the invoice BO to move from one status to another during the data entry sub-process 204 can include "finish data entry processing." In some examples, the data entry sub-process 204 can be projected as an invoicing service. Consequently, the actions provided within the data entry sub-process 204 can define the lifecycle of the invoice BO. To ensure reliability of such business processes, the constraints can be validated, as discussed herein, so that the invoice BO moves through the correct execution statuses and ends up in one of the primary goal or recovery goal statuses.

FIG. 2B depicts an example object model 250. The example object model 250 is provided as a BO model that includes a core BO model 252 and a constraint-driven lifecycle model 254 referred to as the SAM schema model. In some examples, the core BO model 252 describes static features or components associated with the BO, and the SAM schema model 254 describes the dynamics, or lifecycle, of the BO. The multi-part modeling of the present disclosure enables the added flexibility of attaching different SAM schema models to the same BO model for the different business cases. Further, the BO and the schema can be extended as needed without affecting the core BOs. The constraints are defined based on execution statuses, where status transitions are caused by actions and events.

As discussed in detail above, a BO can include attributes or variables. The attributes are initialized at the time of instantiation of the BO and can assume different values during the business process that acts on the BO. In the example of FIG. 2A, the invoice BO 210 in the invoicing process 200 can include attributes such as Order ID, number of order items, and amount. As also discussed above, a BO is associated with a number of status variables (SV), each SV representing the status of the BO during a sub-process of the lifecycle of the BO and having a set of values associated therewith, including an initial value. In the example context, the Data_Entry SV can assume one of the values "finished" and "in process." The status variables of a BO together represent the combined status or state of the BO. During the business process, actions are performed that cause status transitions. In the example object model 250 of FIG. 2B, actions can be referenced as atomic actions (AA). In the example context, the "finish data entry processing" action moves the BO from the "in process" status to the "finished" status.

In some examples, a SV can be affected by several AAs, while an AA only affects a single SV or no SV at all. In some examples, the effect of an AA on a SV can be deterministic or non-deterministic (i.e., the AA sets the SV always to a specific value, or to one of several possible values depending on some user input or attributes of the BO). In the example context, the "modify" action can display options and, based on user input selecting an option, moves the BO non-deterministically to either the "saved" status or the "submitted" status.

Status transitions are caused by actions, events, and/or derivations. In some examples, an event is fired when a SV has a certain value, and causes a specific status transition that can be used to synchronize the values of different SVs.

For example, a "in approval" status value of an Approval SV, discussed in further detail below, causes an event to synchronize the value of the Data_Entry SV to "finished."

In some examples, a derivation is provided as a means to dynamically determine status information from multiple SVs. A derivation also enables distribution of the status information of a parent BON to multiple descendent BONs and vice versa and modeling dependencies among BONs. For example, and with reference to FIG. 2A, if an invoice is rejected, a status can be set to "void."

The BO model of the present disclosure provides a strong foundation for designing flexible and customizable business processes to meet varying consumer requirements. The BO model further provides a general framework that can be extended for different types of BOs.

Figure 3:
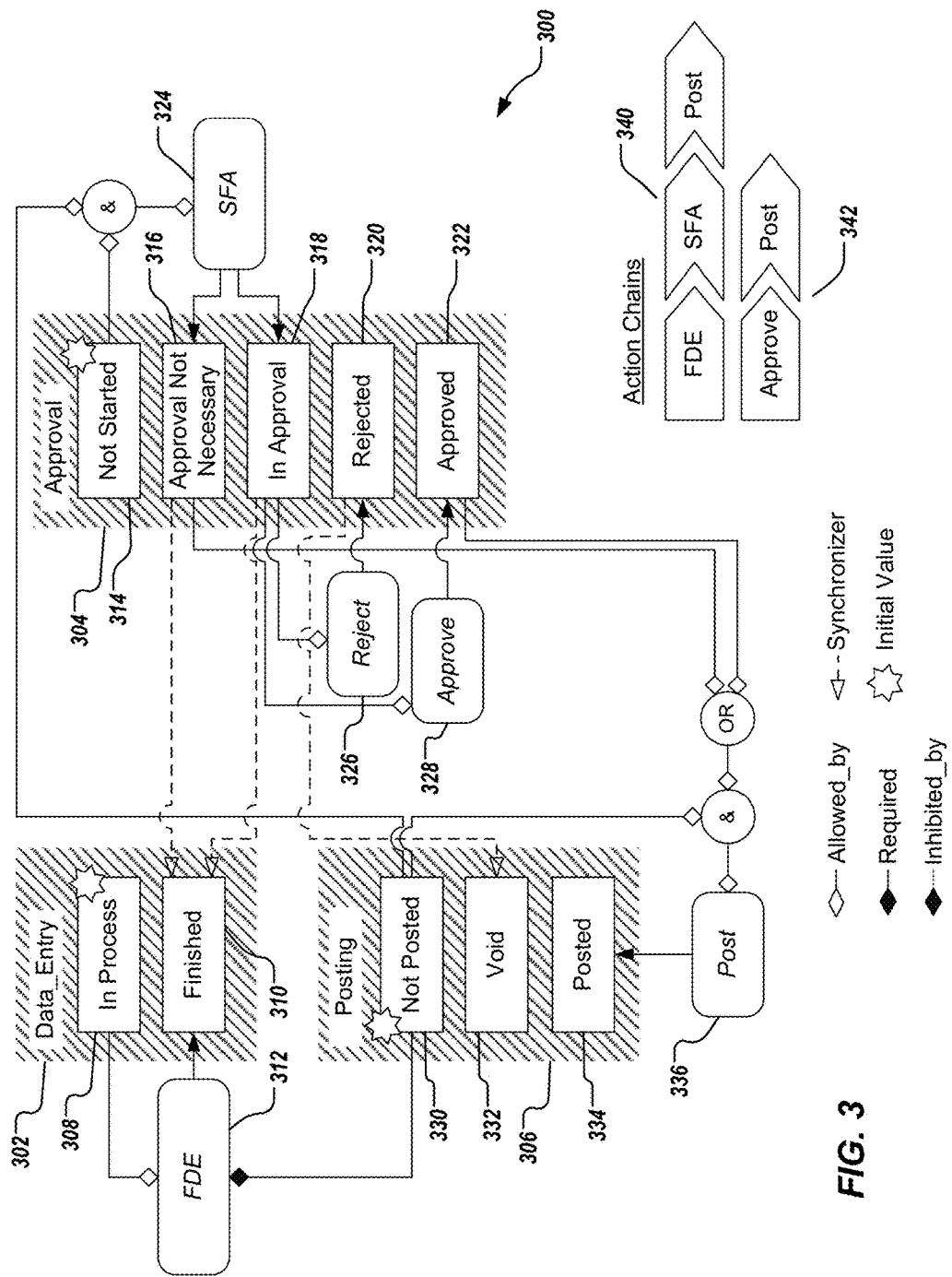
FIG. 3 depicts an example status and action management (SAM) schema providing constraints on actions that can be executed in the example context of FIG. 2A.

FIG. 3 depicts an example SAM schema 300 providing constraints on actions that can be executed in the example context of FIG. 2A. More particularly, FIG. 3 depicts a Data_Entry SV 302, an approval SV 304 and a Posting SV 306. Example values for the Data_Entry SV 302 include "finished" 308 and "in process" 310. An example action that can be executed to transition the Data_Entry SV 302 between values includes "finish data entry processing" (FDE) 312. Example values for the Approval SV 304 include "not started" 314, "approval not necessary" 316, "in approval" 318, "rejected" 320 and "approved" 322. Example actions that can be executed to transition the Approval SV 304 between values include "app_submit" 324 (submit for approval (SFA)), "reject" 326 and "approve" 328. Example values for the Posting SV 306 include "not posted" 330, "void" 332 and "posted" 334. An example action that can be executed to transition the Posting SV 306 between values includes "post" 336.

FIG. 3 provides a graphical representation of constraint types that can be defined in the example BO model (e.g., of FIG. 2B). In the depicted example, an action is enabled if any one of the "Allowed_by" and all of the "Required" conditions (constraints) are true, and all of the "Inhibited_by" conditions (constraints) are false. Each of these conditions can be more complex if, for example, values of multiple SVs are joined using logical operators (e.g., AND, OR). In the example constraints of FIG. 3, "post" 336, which affects the value of the Posting SV 306, is executable when the Approval SV 304 has the value of either "approval not necessary" 316 OR "approved" 322 AND (&) the Posting SV 304 has the value "not posted" 330 (i.e., the invoice has not been posted).

In some implementations, the BO model depicts a SAM model and can be defined using a machine-readable specification language. An example specification language can be denoted by the acronym SAMLA (e.g., SAM LAnguage). In the example context, an example specification can be provided as:

```
BON BusinessObj {
    STATUS_VARS Data_Entry, Approval, Posting
    VARIABLE Data_Entry
        VALUES finished, in_process
        INITIAL in_process
    VARIABLE Approval
        VALUES not_started, approval_not_necessary, in_approval,
            rejected, approved
        INITIAL not started
    VARIABLE Posting
        VALUES not_posted, void, posted
        INITIAL not_posted
```
-continued
```
    ACTIONS ACT_Finish_Data_Entry_Processing, ACT_App_Submit,
        ACT_Reject, ACT_Approve, ACT_Post
    SCHEMAS Schema1
}
``` where a BON represents a BO model. Generally, and as depicted in the example above, a BON specification defines the list of SVs, the set of values for each SV including the initial value, the AAs, and schemas associated with the BO. In some implementations, an example schema model can be provided as:

```
SCHEMA Schema1 {
    ACTION ACT_Finish_Data_Entry_Processing
        ALLOWED_BY               Data_Entry = in_process
        REQUIRED                 Posting = not_posted
    ACTION ACT_App_Submit
        ALLOWED_BY               Approval = not_started &
                                 Posting = not_posted
    ACTION ACT_Reject
        ALLOWED_BY               Approval = in_approval
    ACTION ACT_Approve
        ALLOWED_BY               Approval = in_approval
    ACTION ACT_Post
        ALLOWED_BY               (Approval = approval_not_necessary
                                 OR approved) AND
                                 Posting = not_posted
    ...
    SYNCHRONIZE Approval = approval_not_necessary OR in_approval
                                 TO Data_Entry = finished
    ...
}
```

In general, and as depicted in the above example, a schema specification defines the constraints on each AA, the state transitions caused by each AAs (i.e., the possible values of the associated SV if the action is performed), and events such as status synchronizers.

Multiple types of constraints can be defined for each AA. In some examples, an action is executable if any one of the ALLOWED_BY constraints is true (i.e., multiple constraints joined by logical OR operations), all REQUIRED constraints are true (i.e., multiple constraints joined by logical AND operation), and none of the INHIBITED_BY constraints is true (i.e., each condition is negated and then joined by logical AND). In some examples, the CAUSES part of an ACTION specification in the schema indicates the effect of the action. In some examples, CAUSES having two or more parts indicates that the result of the AA is non-deterministic (e.g., the modify action in the example schema model above). In some examples, SYNCHRONIZE denotes an event that sets a second SV to the specified value when a first SV is assigned a certain value.

As discussed above, a FSM is generated based on the SAM model (BO model). In some implementations, the SAM model is mapped onto a FSM, and the FSM is used for the verification of the BO and schema models. Each state of the FSM can be represented as a status vector that describes the status of the BO at the particular state. In some examples, the status vector is provided based on each of the SVs of the BO and the respective values of the SVs at the particular state. In some examples, an initial state of the FSM represents a complete assignment of each of the SVs to their initial values. Transition relations capture the fact that the values of the SVs change due to the effects of AAs.

In some implementations, action chains can be provided. More particularly, cases can exist where the execution of an action should lead to the automatic execution of one or more other actions. Accordingly, action chains can be provided to simplify execution by automatically triggering a number of actions. In some examples, types of action chains can include "chained SAM actions," "non-SAM action calling multiple SAM actions," and "modify calling multiple SAM actions."

In the example of FIG. 3, example action chains 340, 342 are provided. The example action chain 340 chains actions 312, 324, 336 of the example SAM schema 300, such that, during run-time and in response to user selection of the FDE action 312, the SFA action 324 and the Post action 336 can be automatically executed. For example, during run-time, a user interface can be displayed to a user and can include a FDE interface (e.g., button). Without the action chain 340, a SFA interface (e.g., button) would be displayed to the user in response to user selection of the FDE interface. However, the action chain 340 results in automatic execution of the SFA action 324 without display of and/or interaction with the SFA interface. In some examples, approval might not be necessary, such that the Post action 336 is automatically executed in response to execution of the SFA action 324 in accordance with the action chain 340. In some examples, approval is required. Consequently, an Approve interface (e.g., button) and a Reject interface (e.g., button) can be displayed to the user, and the user can select the Approve interface, for example. Without the action chain 342, a Post interface (e.g., button) would be displayed to the user in response to user selection of the Approve interface. However, the action chain 342 results in automatic execution of the Post action 336 without requiring display and/or interaction with the Post interface.

As discussed in further detail herein, extension of a core SAM schema can result in invalidity of one or more action chains. In some examples, SAM extensions, which might be harmless for manually called SAM actions, may break the action chains in statuses where, in the original (core) SAM schema, it would not be the case. This can occur, for example, because the extensions delay SAM actions in the original SAM schema in order to insert the actions from the extension into the extended SAM schema. Consequently, an extension can result in an action chain no longer functioning as originally intended. In some examples, action chains are used for automation. Consequently, and as discussed by example above, means to manually trigger the chained actions (e.g., displayed user interaction elements such as buttons) are not available (e.g., buttons removed from the user interface (UI), web services not available, etc.). That is, for example, an action is triggerable when a UI or a web service is available for execution of the action. In some examples, interference between action chains and extensions, status transitions can be interrupted at unforeseen statuses, and missing means to manually trigger actions can result in a "deadlock" in the SAM schema during run-time. The effect is that, not only do the action chains stop working as intended, but also the extended SAM schema is incorrect.

Accordingly, implementations of the present disclosure provide action chain modeling, such that extended SAM schemas can be verified in view of one or more action chains. In some examples, explicit requirement to disallow business logic in chained SAM actions can be considered as a special case of action chains where business logic is optional. In some examples, action chain enablement can be addressed by enablement models of different strength, where, for example, a minimal requirement for an action chain to be enabled can include that the first SAM action in the action chain must be allowed. In some examples, rollback of the action chain is not considered within the action chain model.

In some implementations, and as introduced above, an action chain is a sequence of SAM actions, where each action has a type within the scope of an action chain. In some examples, types of actions include soft actions and hard actions. In some examples, soft actions are used for optional tasks (e.g., if an action is not allowed execution proceeds with the next action). In some examples, a hard action breaks execution of the chain if the action is not allowed.

In some implementations, models for action chain enablement can include: the first action in the chain is allowed when the action chain is invoked; all actions are allowed at the appropriate time; and all actions are allowed when the action chain is invoked. In some examples, action chain execution models can include a soft chaining model and a hard chaining model. In some example, the soft chaining model tries to execute all actions in the action chain even if some of the actions are not allowed. In this case, all actions in the action chain are of the type soft. In some examples, the hard chaining model breaks execution of the action chain at the first action that is not allowed. In this case, all actions in the action chain are of the type hard. In some examples, an action chain can include hard actions and soft actions, and can result in mixed chaining.

In some implementations, additional business logic used before, after and between, but not within, actions does not impact potential executions of the action chain from the status perspective, as long as additional business logic does not take over explicit control over the execution of the action chain. That is, as long as the follow-on SAM action after the execution of a business logic block is always called (if allowed), and there are no alternative execution paths through the action chain controlled by the business logic. Consequently, and in some examples, the business logic is not considered to be part of the action chain model, but only optionally used in the implementation of the action chain as long as the above rules are not violated.

Hard action chains can be modeled based on the following example pseudo-code:

```
<business logic>
If (action1_allowed) then action
    else break execution;
<business logic>
If (action2_allowed) then action
    else break execution;
<business logic>
...
```

Soft action chains can be modeled based on the following example pseudo-code:

```
<business logic>
If (action1_allowed) then action;
<business logic>
If (action2_allowed) then action;
<business logic>
...
```

Mixed action chains can be modeled based on the following example pseudo-code:

```
<business logic>
If (action1_allowed) then action
    else break execution;
<business logic>
If (action2_allowed) then action;
<business logic>
If (action3_allowed) then action
    else break execution;
<business logic>
...
```

In summary, and with particular reference to soft chaining, an action chain can execute all allowed actions independent of the result of the previous action in the action chain. With particular reference to hard chaining, an action chain breaks execution at the first forbidden action in the action chain. With particular reference to mixed chaining, execution of an action chain will stop at the first action that is forbidden and that is of the hard type.

As discussed in further detail herein, the SAM schema can be customized. Consequently, it should be determined whether the customized SAM schema is valid (whether the defined goals each appear in at least one trace) and action chains are unbroken (valid). In some examples, a customization can include the implementation of one or more action chains, discussed above, and/or one or more extensions to the SAM schema.

In some examples, if the SAM schema is determined to be invalid, one or more traces that resulted in the invalid status of the SAM schema can be displayed to a user on a display. In this manner, the user can be made aware of problematic traces and can revise the invalid SAM schema to provide a valid SAM schema. In some examples, if one or more action chains are determined to be invalid in view of the SAM schema, an indication of invalid action chain(s) can be provided. In some examples, a resolution can be provided (e.g., adding an action chain).

Implementations of the present disclosure address extensibility of a core SAM schema to provide an extended SAM schema. In some implementations, requirements for model (SAM schema) extension can include that an extension should not modify the model (because only then extensions and model changes are reconcilable); two extensions should not conflict with each other; extensions should be extensible as well; and extensions should only influence the model in such a way, that the functionality of the BO using the model is not be harmed.

In some implementations, a SAM extension adds additional actions to the BON, as well as status variables and an additional model snippet containing the SAM model for the extension. In some examples, the added elements are modeled in a BO extension that points to a BO and that extends the BO. In some examples, the BO extension includes BON extensions, each of which points to a respective BON of the BO. In some examples, the BON extensions have the same names as the BONs that they point to, but the namespaces can be different. In some examples, a BON extension carries the additional (enhanced) actions and (enhanced) status variables (SVs) that are defined as part of the BON extension. Furthermore the BON extension carries a status schema extension pointing to a status schema. In some examples, a status schema extension has the same name as the status schema that it points to, but includes a different namespace.

In some implementations, the extensibility of SAM schemas follows rules that ensure that the resulting model does not harm the functionality of the underlying BO. In some examples, the following modeling elements are allowed in a SAM schema extension: status variables, actions, preconditions, status transitions (including actions with multiple status transitions), synchronizers, stateguards and overall derivation. In some examples, the following rules describe which modeling elements are allowed/not allowed between the extension and the underlying (core) SAM schema and the SAM schema extension:

Underlying (core) SAM schema→Extension:
Allowed=preconditions and synchronizers
Not Allowed=status transitions or derivation edges
Extension→Underlying (core) SAM schema:
Allowed=inhibiting preconditions and requiring preconditions
Not Allowed=status transitions, enabling preconditions, derivation edges, synchronizers, or neutral preconditions Further rules can include that a SAM schema extension should not add, change or remove edges that are neither connected to an extension status nor to an extension action. For example, the following are not allowed: adding or deleting preconditions within the core SAM schema adding or deleting status transitions within the core SAM schema. In some examples, an extension should not lead to a deadlock. That is, an extension should, at most, only delay when an action of the core SAM schema can be executed, but should not forbid the action. In some examples, an extension can lead to a deadlock. For example, deadlocks can be allowed for traces that would result in recovery goals in the core SAM schema. In some examples, synchronizers to extensions can originate from any status value of the core SAM schema except values of a derived status variable or values other than the initial value that can be set by a state guard. In some examples, no additional flag indicating when a status value can be used as the origin of a synchronizer can be provided.

In general, the example rules discussed above are provided to avoid influencing the behavior of the underlying BO in an illegal way. The rules ensure that the state and the status of a BO are always in synchronization with one another. Further, shortcuts are not achievable using an extension. Accordingly, a status transition from an extension action to a status value of the underlying BO (core status value) is not allowed, because it would then be possible to set a core status value without having the corresponding state of the BO (i.e., the state and the status would be out of synchronization with one another, which is not allowed). The state of the core BO can only be maintained by executing core actions. For this reason, shortcuts (e.g., bypassing a core action) by means of the extension are also not allowed. The integrity of the core BO is only maintained if no core action is bypassed. If a core action were bypassed, new states would be possible in the core, which would not be able to be processed. Further, a bypassed core action would not be able to transform the state of the BO corresponding to the status change. Consequently, no modeling elements are allowed that would lead to set a core status or to bypass a core action.

Figure 4:
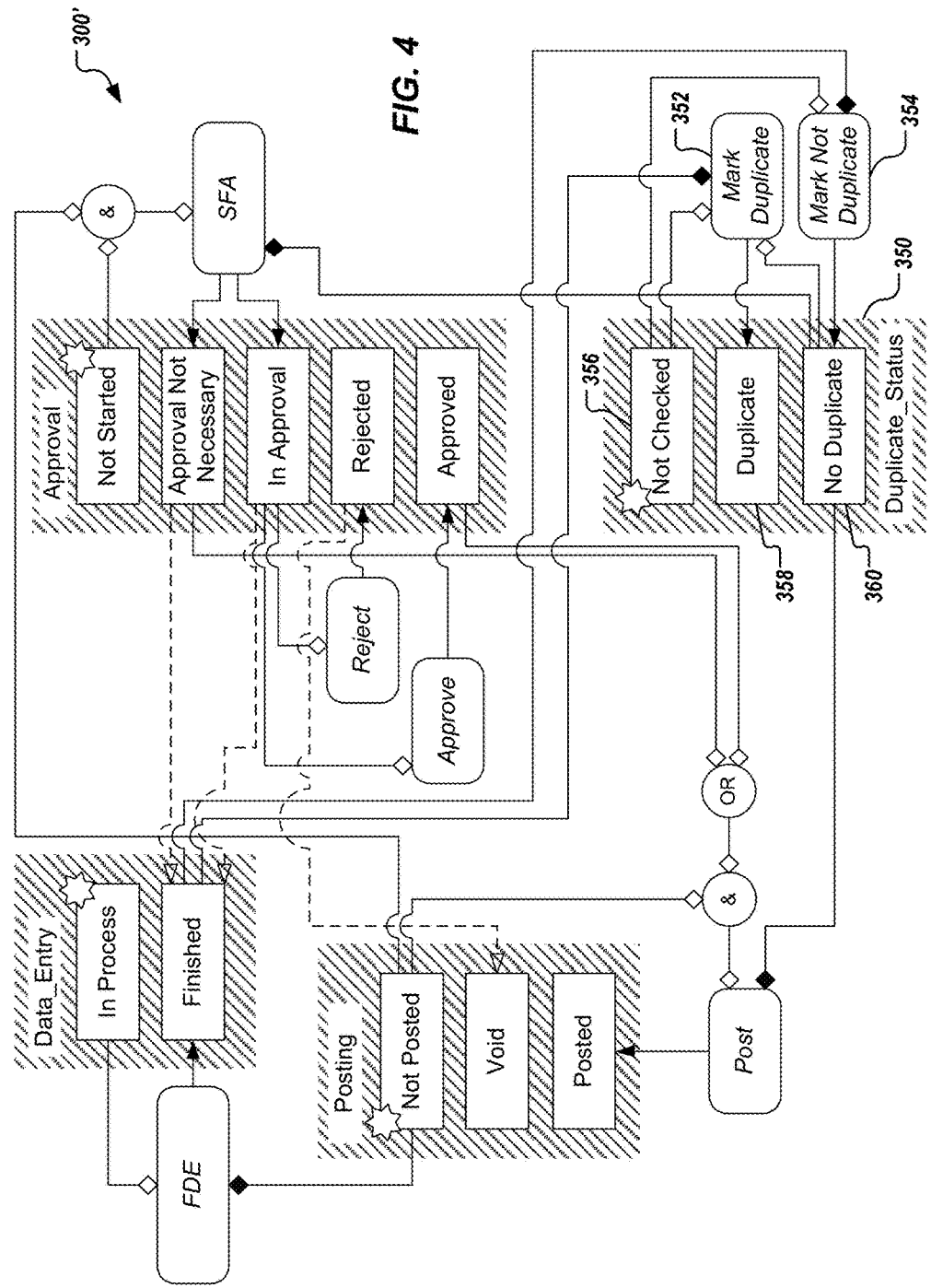
FIG. 4 depicts an example extended SAM schema based on the SAM schema of FIG. 3.

FIG. 4 depicts an example extended SAM schema 300' based on the SAM schema 300 of FIG. 3. In an example, the invoice process has been extended to include duplicate analyzer business logic. Consequently, in the example of FIG. 4, the core SAM schema 300 of FIG. 3 has been extended to include a Duplicate_Status SV 350 and the actions "mark duplicate" (MD) 352 and "mark not duplicate" (MND) 354 to provide the extended SAM schema 300' of FIG. 4. Example values for the Duplicate_Status SV 350 include "not checked" 356, "duplicate" 358 and "no duplicate" 360. For purposes of clarity, reference numbers for elements provided in both FIGS. 3 and 4 are absent from FIG. 4. In the depicted example, constraints include that the Data_Entry SV 302 must have the value of "finished" 310 before the actions "mark duplicate" 352 and "mark not duplicate" 354 can be performed.

Figure 5:
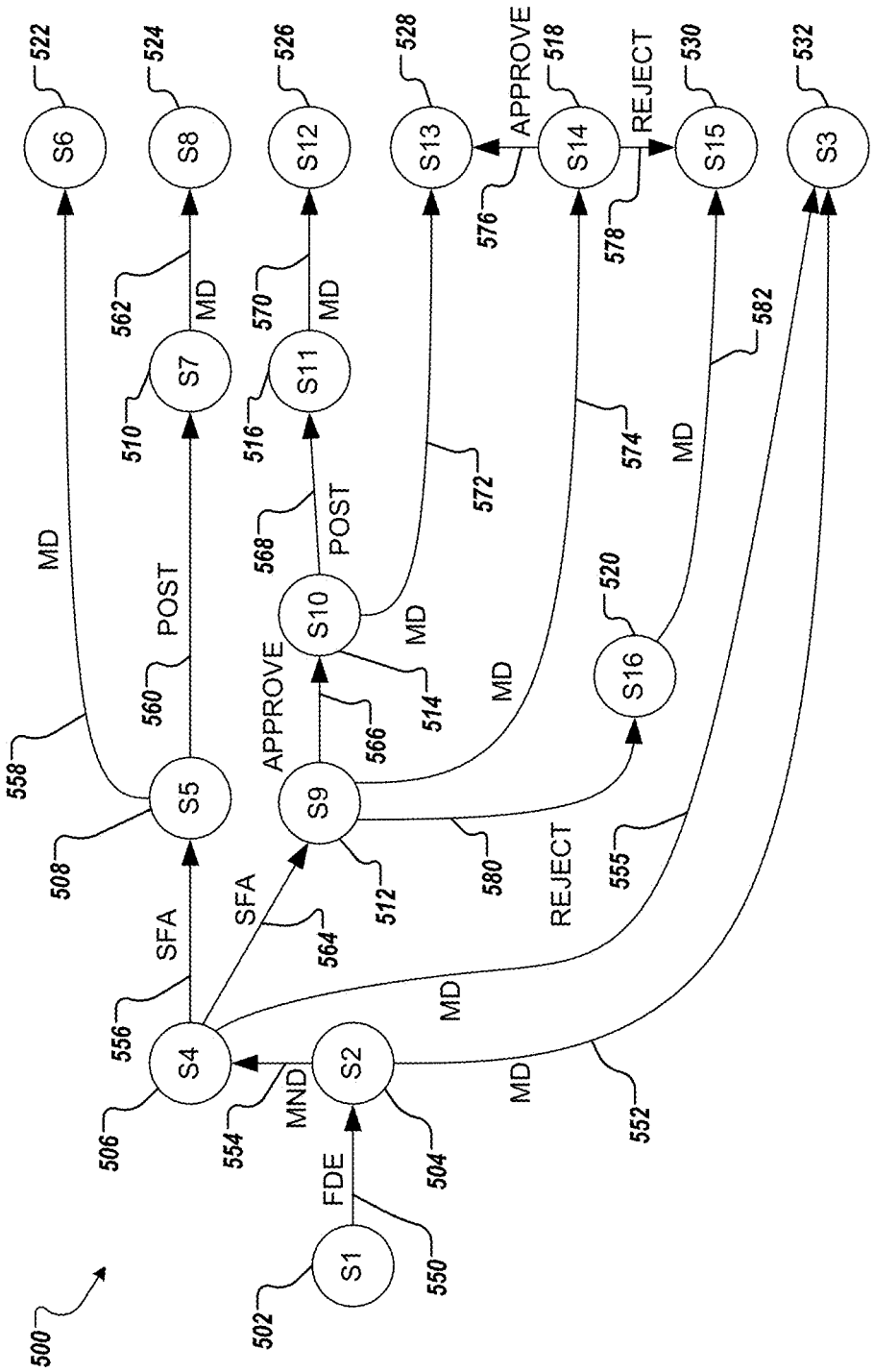
FIG. 5 depicts an example state diagram based on the example extended SAM schema of FIG. 4.

FIG. 5 depicts an example state diagram 500 based on the example extended SAM schema 300' of FIG. 4. The example state diagram 500 includes a root node 502, intermediate nodes 504, 506, 508, 510, 512, 514, 516, 518, 520 and leaf nodes 522, 524, 526, 528, 530, 532 where each node represents a status (status vector (SV)) of, in the example context, an invoice BO, and edges between nodes represent actions (AAs) that can be performed on the invoice BO to transition the status of the invoice BO to another state. In some examples, the status vectors for the example of FIGS. 3 and 4 can be provided using the following order of the status variables (Data_Entry, Approval, Posting, Duplicate_Status).

The example state diagram 500 of FIG. 5 can depict state transitions of an invoice BO, for example. In some examples, the invoice BO can track the finalization of entering the invoice data before the invoice is submitted for approval. In some examples, the submit for approval (SFA) action determines whether an approval is necessary based on some business logic (e.g., depending on the total amount of the invoice). If no approval is necessary, the invoice can be posted. Otherwise, the invoice has to be rejected or approved. After approval, the invoice can be posted. In some examples, and from a business perspective, the main purpose, or intention, of the invoice BO is the posting of the invoice (the desired outcome). If posting is not possible, processing of the invoice can also be concluded by rejecting the invoice (an acceptable outcome).

With continued reference to FIG. 5, the root node 502 reflects an initial state (S1) of the invoice BO, defined as:
S1=(in_process, not_started, not_posted, not_checked)
An edge 550 represents the "finish_data entry_processing" (FDE) action that can be performed to transition the invoice BO from the initial state to an intermediate state represented by the intermediate node 504 and defined as:
S2=(finished, not_started, not_posted, not_checked)
An edge 552 represents the "mark duplicate" (MD) action that can be performed to transition the invoice BO from the initial state to a final state represented by the leaf node 532 and defined as:
S3=(finished, not_started, not_posted, duplicate)
An edge 554 represents the "mark_not_duplicate" (MND) action that can be performed to transition the invoice BO from the intermediate state represented by the intermediate node 504 to the intermediate state represented by the intermediate node 506 and defined as:
S4=(finished, not_started, not_posted, no_duplicate)
An edge 555 represents the "mark_duplicate" action that can be performed to transition the invoice BO from the intermediate state represented by the intermediate node 506 to the final state represented by the leaf node 532.
An edge 556 represents the "app_submit" (SFA) action that can be performed to transition the invoice BO from the intermediate state represented by the intermediate node 506 to an intermediate state represented by the intermediate node 508 and defined as:
S5=(finished, approval not_necessary, not_posted, no_duplicate)
An edge 558 represents the "mark_duplicate" action that can be performed to transition the invoice BO from the intermediate state represented by the intermediate node 508 to the final state represented by the leaf node 522 and defined as:
S6=(finished, approval_not_necessary, not_posted, duplicate)
An edge 560 represents the "post" action that can be performed to transition the invoice BO from the intermediate state represented by the intermediate node 508 to the intermediate state represented by the intermediate node 510 and defined as:
S7=(finished, approval_not_necessary, posted, no_duplicate)
An edge 562 represents the "mark_duplicate" action that can be performed to transition the invoice BO from the intermediate state represented by the intermediate node 510 to the final state represented by the leaf node 524 and defined as:
S8=(finished, approval_not_necessary, posted, duplicate)
An edge 564 represents the "app_submit" action that can be performed to transition the invoice BO from the intermediate state represented by the intermediate node 506 to an intermediate state represented by the intermediate node 512 and defined as:
S9=(finished, in_approval, not_posted, no_duplicate)
An edge 566 represents the "approve" action that can be performed to transition the invoice BO from the intermediate state represented by the intermediate node 512 to an intermediate state represented by the intermediate node 514 and defined as:
S10=(finished, approved, not_posted, no_duplicate)
An edge 568 represents the "post" action that can be performed to transition the invoice BO from the intermediate state represented by the intermediate node 514 to the intermediate state represented by the intermediate node 516 and defined as:
S11=(finished, approved, posted, no_duplicate)
An edge 570 represents the "mark_duplicate" action that can be performed to transition the invoice BO from the intermediate state represented by the intermediate node 516 to the final state represented by the leaf node 526 and defined as:
S12=(finished, approved, posted, duplicate)
An edge 572 represents the "mark_duplicate" action that can be performed to transition the invoice BO from the intermediate state represented by the intermediate node 514 to the final state represented by the leaf node 528 and defined as:
S13=(finished, approved, not_posted, duplicate)
An edge 574 represents the "mark_duplicate" action that can be performed to transition the invoice BO from the intermediate state represented by the intermediate node 512 to the intermediate state represented by the intermediate node 518 and defined as:
S14=(finished, in_approval, not_posted, duplicate)
An edge 576 represents the "approve" action that can be performed to transition the invoice BO from the intermediate state represented by the intermediate node 518 to the final state represented by the leaf node 528, discussed above.
An edge 578 represents the "reject" action that can be performed to transition the invoice BO from the intermediate state represented by the intermediate node 518 to the final state represented by the leaf node 530 and defined as:
S15=(finished, rejected, not_posted, duplicate)
An edge 580 represents the "reject" action that can be performed to transition the invoice BO from the intermediate state represented by the intermediate node 512 to the intermediate node represented by the intermediate node 520 and defined as:

S16=(finished, rejected, not_posted, not_checked)

An edge 582 represents the "mark_duplicate" action that can be performed to transition the invoice BO from the intermediate state represented by the intermediate node 520 to the final state represented by the final node 530, discussed above.

Although an example FSM is graphically represented above (i.e., in FIG. 5), it is appreciated that the FSM can be represented, or encoded in a machine-readable language within a document (e.g., a document that can be processed by one or more computing devices). More specifically, representing the SAM schema in terms of a FSM enables encoding of the SAM schema as input program code of a computer-executable model checking tool for validating the SAM schema. In the encoded schema model (i.e., the FSM), the verification criteria are expressed as logical assertions that can be checked for validity and violations thereof can be reported.

As discussed above, the SAM schema (BO model) can be validated based on the FSM and the defined goals (e.g., using a computer-executable model checking tool). To illustrate such validation, the example state diagram 500 and example goals are referenced within the example context discussed above. The example goals can include the ability to reach each of the following states:

S3=(finished, not_started, not_posted, duplicate)
S6=(finished, approval_not_necessary, not_posted, duplicate)
S7=(finished, approval_not_necessary, posted, no_duplicate)
S8=(finished, approval_not_necessary, posted, duplicate)
S11=(finished, approved, posted, no_duplicate)
S12=(finished, approved, posted, duplicate)
S13=(finished, approved, not_posted, duplicate)
S14=(finished, in_approval, not_posted, duplicate)
S15=(finished, rejected, not_posted, duplicate)
S16=(finished, rejected, not_posted, not_checked)

As also discussed above, and in some implementations, a SAM schema is deemed to be valid if every goal appears in at least one trace. In the example of FIG. 5, the goals represented by the nodes 532, 522, 510, 524, 516, 526, 528, 518, 530, 520 each appear in at least one trace. Consequently, the SAM schema represented by the state diagram 500 of FIG. 5 is valid.

In accordance with implementations of the present disclosure, validity of an extended SAM schema can be evaluated based on goals and action chains. In some examples, preconditions and/or assumptions can be provided and can include that the extended SAM schema is valid (i.e., is without deadlocks and lifelocks), and BO goals are provided as all reachable final states of the BO (no deadlock condition), intermediary states (defined as additional goals) so that each loop eventually reaches a goal (no lifelock condition), and further intermediary states of the schema may be defined as additional goals (purely based on business demand). In some implementations, a computer-executable model checking tool is provided and receives input including the extended SAM schema, the action chains, triggerable actions (e.g., UI buttons, web service interfaces), and BO goals (e.g., individual goals, goal groups, primary/recovery goals). In some examples, the extended SAM schema is verified based on differentiating between original executions of the extended SAM schema (i.e., all actions manually triggerable, but no action chains are implemented), and actual executions of the extended SAM schema (i.e., not all actions are manually triggerable, but action chains are used). Accordingly, verification of the extended SAM schema includes calculating actual executions (traces) of the extended SAM schema, and identify BO goals not reachable by the actual executions (traces).

Figure 6:
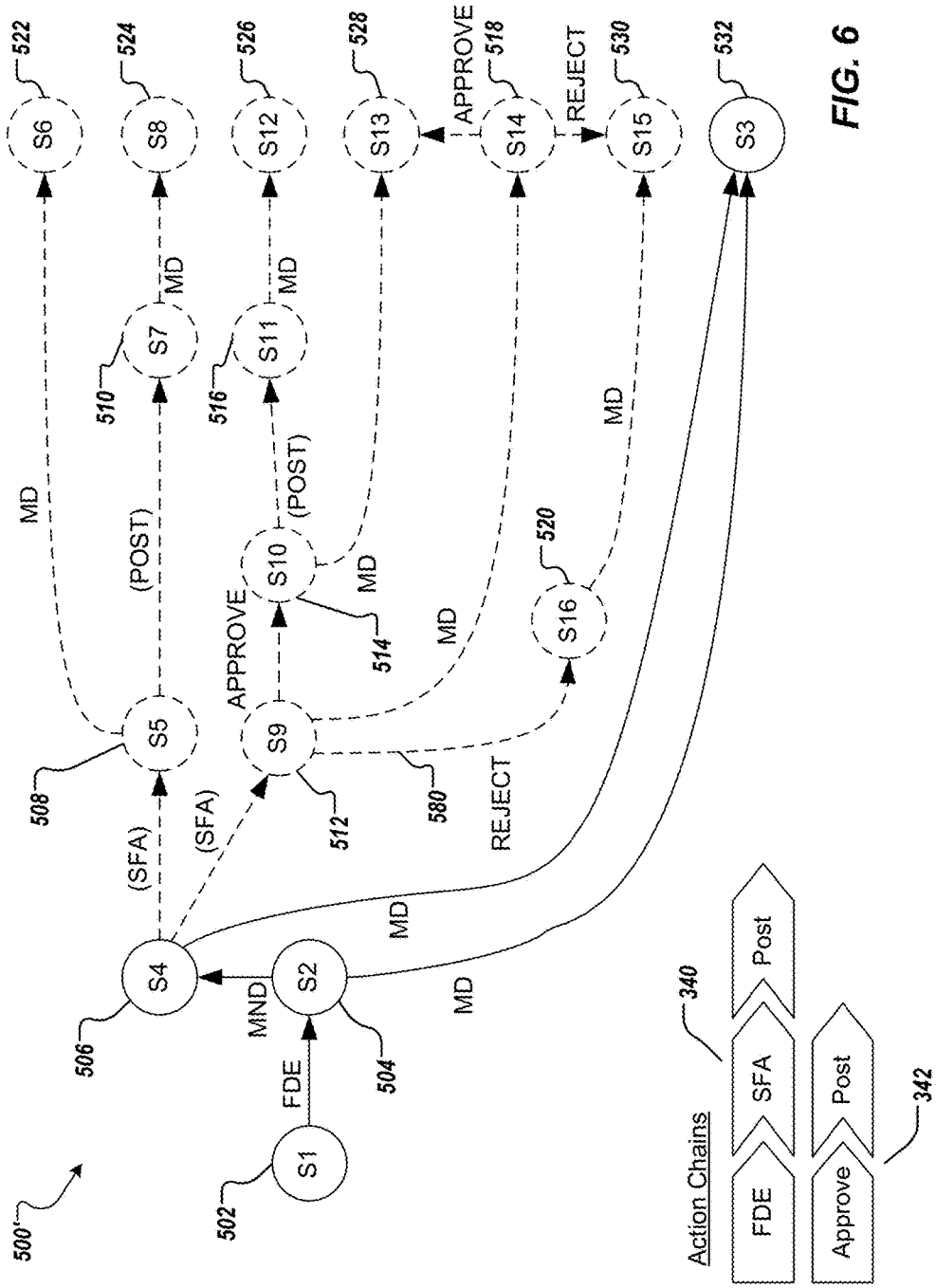
FIG. 6 depicts the example state diagram of FIG. 5 in view of application of example action chains.

FIG. 6 depicts the example state diagram 500 of FIG. 5 in view of application of the example action chains 340, 342 of the non-extended SAM schema 300 of FIG. 3. The example of FIG. 6 depicts an example approach for verifying the extended SAM schema in view of goals and action items, wherein the goals are provided as individual goals. This example approach includes BO goals being defined by a user as state vectors, where the validity of action chains, and thus the extended SAM schema, depends on the reachability of all of the BO goals. In this example approach, analysis determines possible executions (traces) based on availability of action chains and triggerability of actions.

In the example of FIG. 6, actions that are not manually triggerable are provided in parentheses (e.g., (SFA), (POST)), and missing actions and unreached states (goals) are shown in dashed line. Accordingly, implementation of the action chains 340, 342 of the original (core) SAM schema 300 of FIG. 3, results in invalidity of the extended SAM schema. More particularly, the action chain 340 is invalid for the extended SAM schema, resulting in the actions and states (goals) displayed in dashed line being unachievable. For example, the BO goals S6, S7, S8, S11, S12, S13, S14, S15 and S16, defined above, are not reachable in the extended SAM schema in view of the action chain 340. In business terms, and for this particular example, the BO goal "post the invoice" is not reachable.

In some examples, a solution can be provided to resolve (partially or fully) problems in the extended SAM schema. An example solution can include providing one or more additional action chains. Continuing with the example of FIG. 6, an example solution can include adding an action chain MND→SFA→Post. In this example, however, implementing the additional action chain still results in the BO goal S6, as defined above, being unreachable. Accordingly, this example only provides a partial resolution.

Figure 7A:
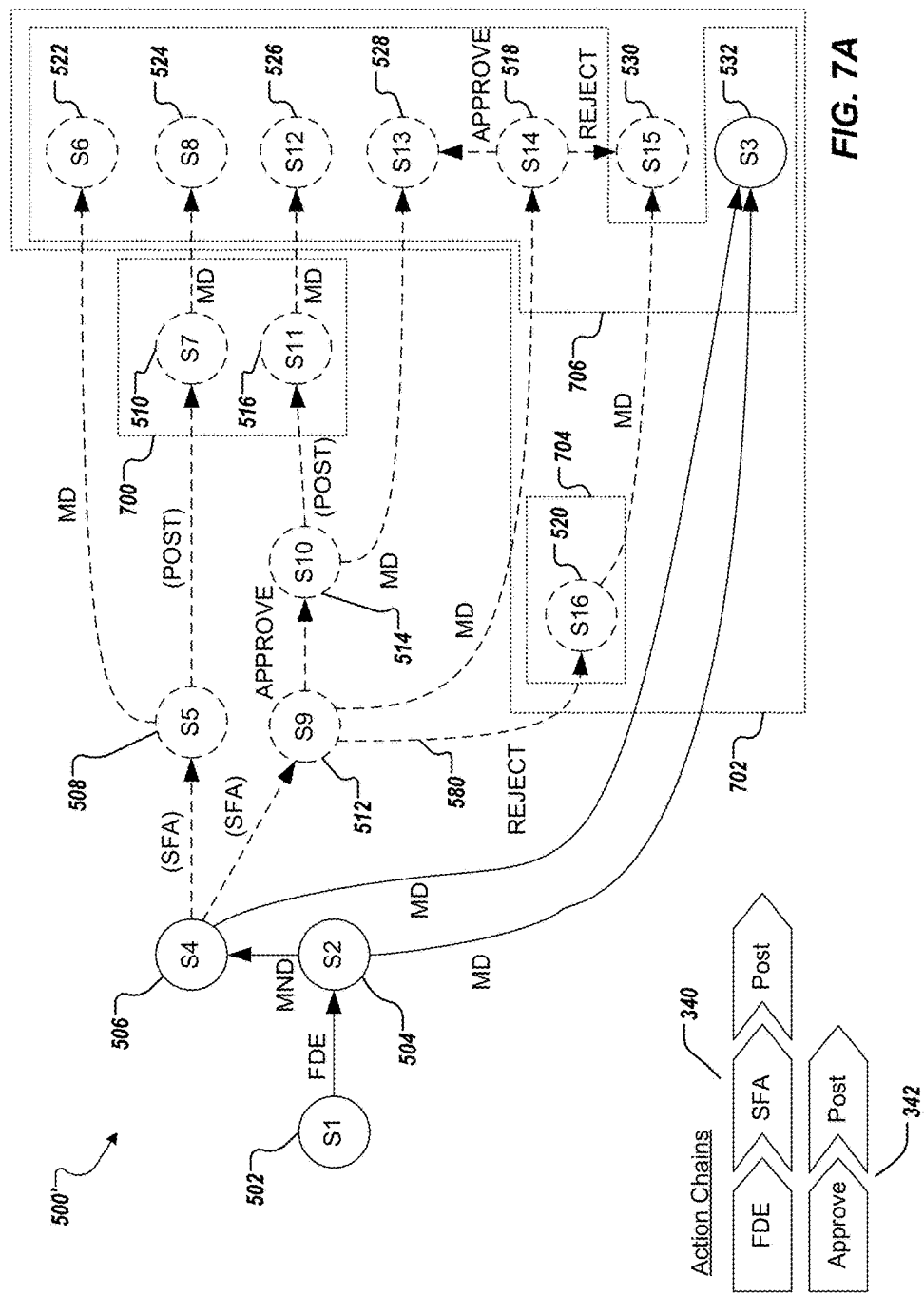
FIG. 7A depicts the example state diagram of FIG. 5 in view of application of the example action chains of FIG. 6 and goal groups.
Figure 7B:
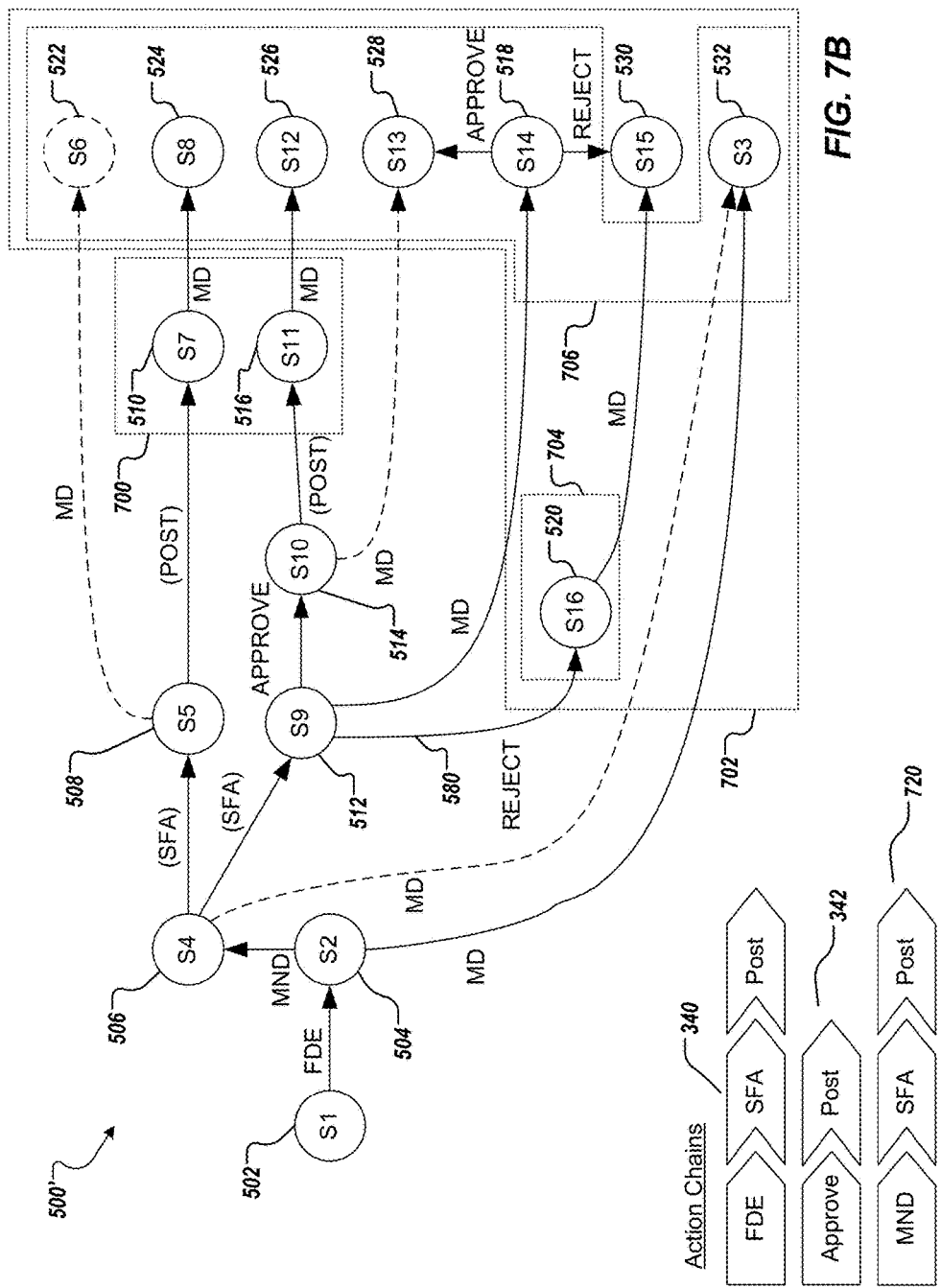
FIG. 7B depicts the example state diagram of FIG. 5 in view of application of the example action chains of FIG. 6 including an additional example action chain and goal groups.

FIGS. 7A and 7B depict another example approach for verifying an extended SAM schema in view of goals and action chains. In this approach, goal groups are defined. As discussed above, each goal group can be represented using wildcards and/or logic operators. In some examples, a goal group can be provided as a tuple of status values (optionally including wildcard(s) and/or logic operator(s)) that achieve a goal of the business process (i.e., a desired outcome). In accordance with this approach, validity of the SAM schema in view of the action chains depends on reachability of each BO goal group, and output of the analysis can include identification of unreachable goal groups.

In the example context, goal groups can include a "Posted" goal group, a "Rejected" goal group and a "Duplicate" goal group. In some examples, the "Posted" goal group can be defined as goals (status vectors) including (finished, approval_not_necessary|approved, posted, no_duplicate), where "|" is provided as the logical operator OR. In some examples, the "Rejected" goal group can be defined as goals (status vectors) including (finished, approval_not_necessary, posted, ?), where "?" is provided as a wildcard. In some examples, the "Duplicate" goal group can be defined as goals (status vectors) including (finished, ?, ?, duplicate).

In the example of FIGS. 7A and 7B, goal sets are provided based on the goal groups. In the depicted example, a goal set 700 corresponds to the "Posted" goal group and a goal set 702 corresponds to the "Duplicate" goal group and the "Rejected" goal group. More particularly, the goal set 702 includes a goal sub-set 704 and a goal sub-set 706. The goal sub-set 704 includes goals (status vectors) that correspond to the "Rejected" goal group, but not the "Duplicate" goal group, and the goal sub-set 706 includes goals (status vectors) that correspond to the "Duplicate" goal group, but not the "Rejected" goal group.

FIG. 7A depicts the example state diagram 500 of FIG. 5 in view of application of the example action chains 340, 342 of the non-extended SAM schema 300 of FIG. 3. In the example of FIG. 7A, actions that are not manually triggerable are provided in parentheses (e.g., (SFA), (POST)), and missing actions and unreached states (goals) are shown in dashed line. Accordingly, implementation of the action chains 340, 342 of the original (core) SAM schema 300 of FIG. 3, results in invalidity of the extended SAM schema. More particularly, the action chain 340 is invalid for the extended SAM schema, resulting in the actions and states (goals) displayed in dashed line being unachievable. For example, the BO goals S6, S7, S8, S11, S12, S13, S14, S15 and S16, defined above, are not reachable in the extended SAM schema in view of the action chain 340. Consequently, the "Posted" goal group and the "Rejected" goal group are not reachable.

In some examples, a solution can be provided to resolve (partially or fully) problems in the extended SAM schema. An example solution can include providing one or more additional action chains. Continuing with the example of FIG. 7A, an example solution can include adding an action chain MND→SFA→Post.

FIG. 7B depicts the result when including the additional action chain (MND→SFA→Post), depicted as action chain 720. As provided in FIG. 7B, at least one goal of each goal group is achieved. For example, although BO goal S6 is not achievable, other BO goals within the same group are achievable. Consequently, adding the action chain 720 renders the extended SAM schema valid.

Figure 8:
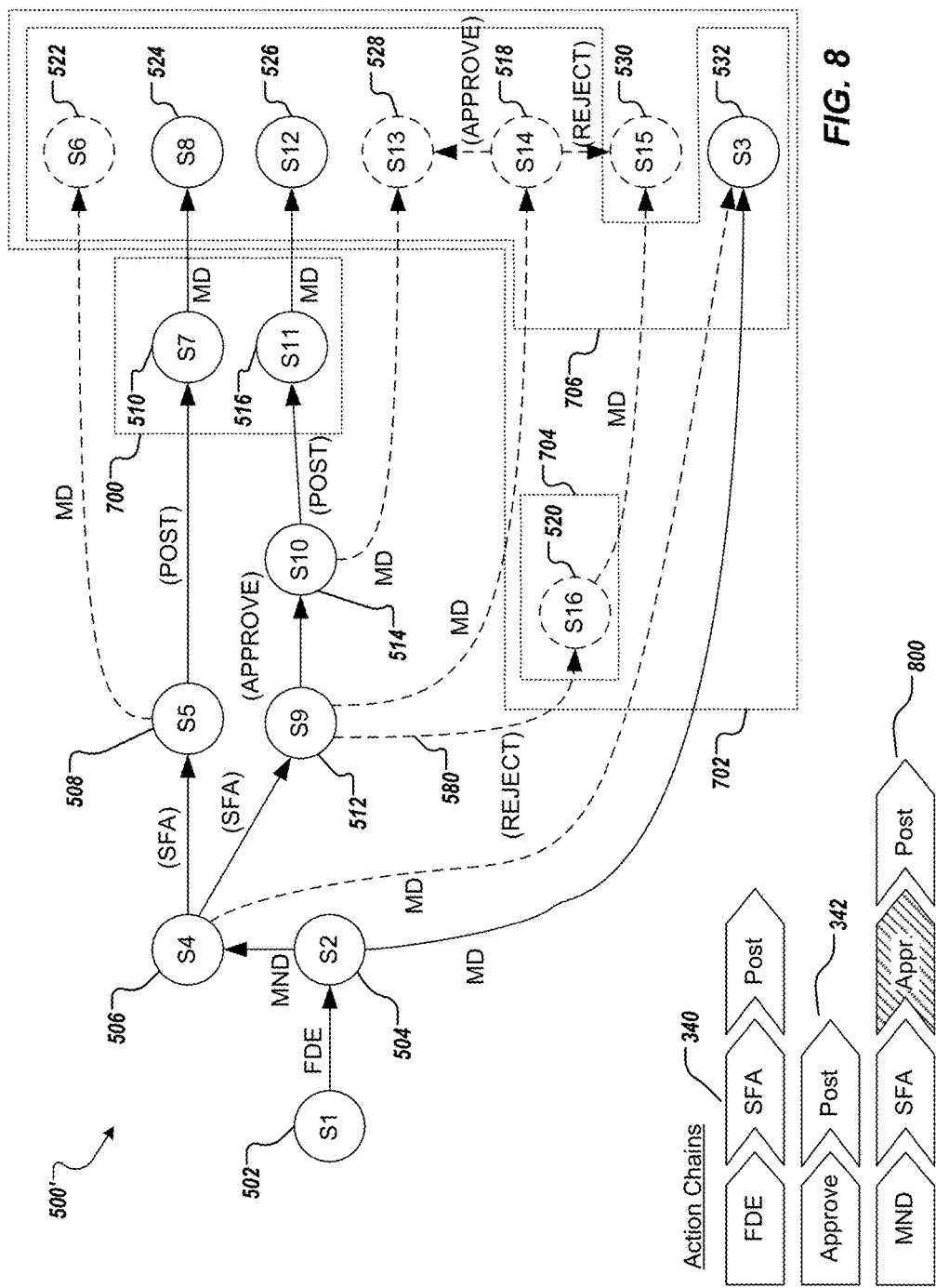
FIG. 8 depicts the example state diagram of FIG. 5 in view of application of the example action chains of FIG. 6 including an additional example action chain and primary and recovery goal groups.

FIG. 8 depicts another example approach for verifying an extended SAM schema in view of goals and action chains. In this approach, goal groups are defined and are classified as primary goals and recovery goals. As discussed above, each goal group can be represented using wildcards and/or logic operators. In some examples, a goal group can be provided as a tuple of status values (optionally including wildcard(s) and/or logic operator(s)) that achieve a goal of the business process (i.e., a desired outcome). In accordance with this approach, validity of the SAM schema in view of the action chains depends on reachability of a BO goal in each primary goal group, and output of the analysis can include identification of unreachable goal groups.

In the example of FIG. 8, the extension includes an action chain 800 (MND→SFA→Approve→Post) (e.g., the extender adds the action chain 800 such that approval is automatically executed, taking away the reject action). In an example, the action chain 800 can be a mixed action chain, the actions MND, SFA, and Post can be hard actions, action Appr. can be a soft action, and the actions approve and reject can be defined to be not triggerable. In view of the goal groups defined above for the example of FIGS. 7A and 7B, the set of action chains is invalid, because the BO goals S15 and S16, being all goals of the "Rejected" goal group, are not achievable.

However, because it was the business decision of the extender to simplify away the reject action, the action chain set, including the action chain 800, should evaluate to valid. In order to achieve this, the definition and reachability of BO goals can be relaxed based on classifying goal groups as primary or recovery goals. For example, the "Posted" goal group can be classified as a primary goal group, and the "Rejected" and "Recovery" goal groups can be classified as recovery goal groups. As noted above, in this approach, validity of the SAM schema in view of the action chains depends on reachability of a BO goal in each primary goal group. Consequently, and using primary and recovery goal classifications, the action chain set is valid, because at least one goal in every primary goal group (the "Posted" goal group) is achievable.

Figure 9:
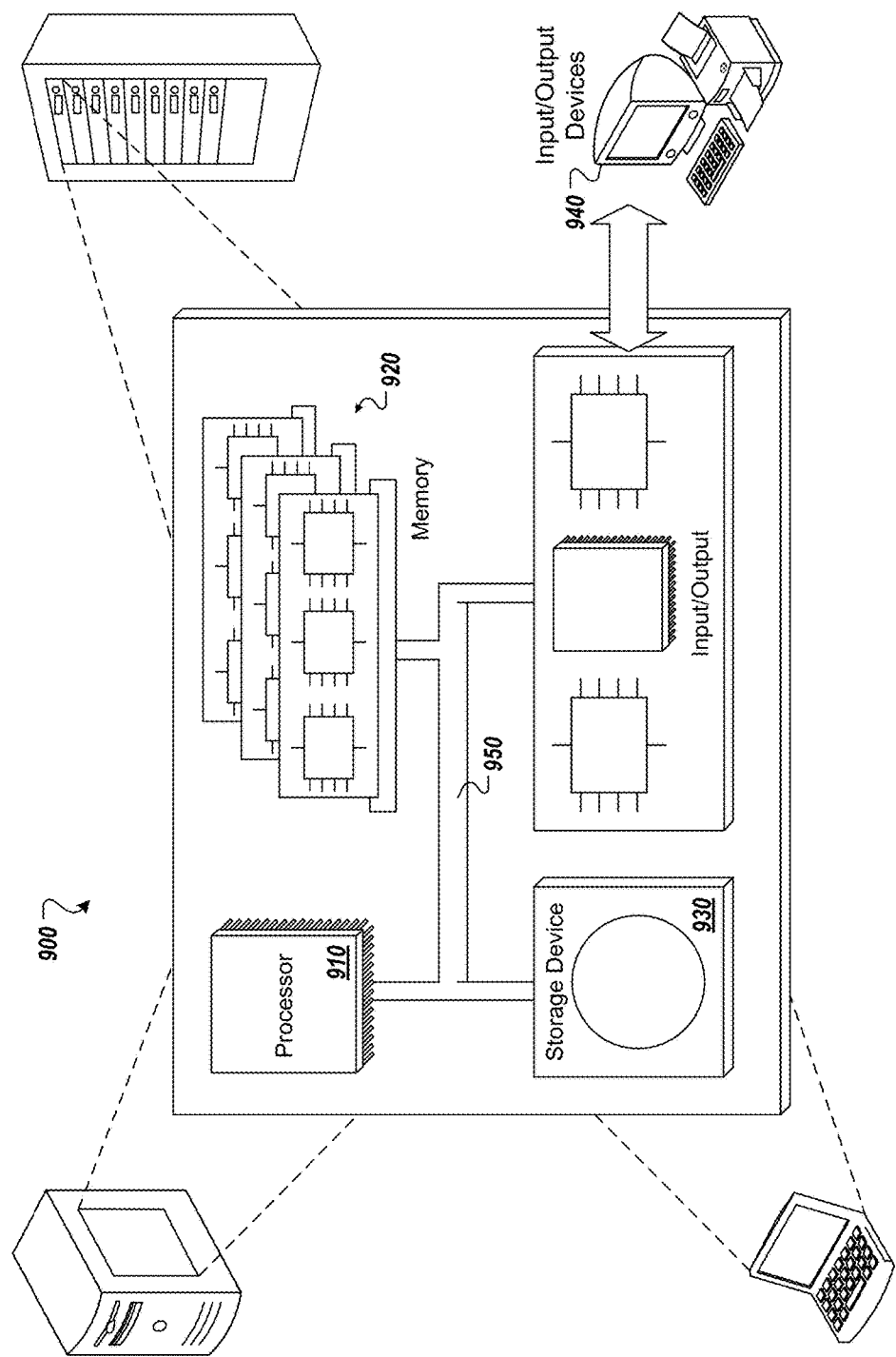
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for evaluating a validity of an extended status and action management (SAM) schema, the method being executed using one or more processors and comprising:

receiving, by the one or more processors, the extended SAM schema, the extended SAM schema being stored as a computer-readable document in memory and being an extension of a core SAM schema that defines constraints of a data object comprising a plurality of data object nodes and defines transitions of status vectors for each of the plurality of data object nodes based on preconditions of the status vectors and based on actions that are performed on a corresponding data object node of the plurality of data object nodes, each of the plurality of data object nodes comprising a plurality of possible status variables corresponding to a plurality of milestones in a lifecycle of respective object node;

providing, by the one or more processors, one or more goals, each of the one or more goals being defined as one of a primary goal indicating a desired outcome of the core SAM schema and a recovery goal indicating an acceptable outcome of the core SAM schema, both the primary goal and the recovery goal being included in the core SAM schema and the one or more goals comprising achievable states defined as respective state vectors and being provided in the computer-readable document stored in memory;

receiving, by the one or more processors, one or more action chains, the one or more action chains representing one or more actions of the extended SAM schema that are to be automatically executed, the one or more action chains being provided in the computer-readable document stored in memory, the one or more actions being associated with triggerability flags, a triggerability flag indicating whether a respective action is only triggerable using a respective action chain; and processing, by the one or more processors, the one or more goals, the one or more action chains and the triggerability flags against the achievable states using a computer-executable model checking tool for evaluating the validity of the extended SAM schema by determining whether the extended SAM schema correctly fulfills an intention, for which the core SAM schema is provided, correctly fulfilling the intention depending on reachability of each of the one or more goals from an initial status vector associated with the extension of the core SAM schema.

2. The method of claim 1, further comprising providing an extended finite state machine (FSM) based on the extended SAM schema, the extended FSM representing states of the extended SAM schema and transitions between states, the extended FSM being provided as the computer-readable document and being stored in memory, wherein processing further comprises processing the extended FSM.

3. The method of claim 2, wherein processing the extended FSM, the one or more goals, the one or more action chains and the triggerability flags comprises generating one or more traces, each trace defining a path of status vectors and actions that are possible through the extended SAM schema.

4. The method of claim 3, wherein processing the extended FSM, the one or more goals, the one or more action chains and the triggerability flags further comprises determining that at least one goal does not appear in any trace and, in response, indicating that at least one action chain of the one or more action chains is invalid, the at least one action chain comprising actions executable to achieve the at least one goal.

5. The method of claim 3, wherein processing the extended FSM, the one or more goals and the one or more action chains further comprises determining that no goal of at least one goal group appears in any trace and, in response, indicating that at least one action chain of the one or more action chains is invalid, the at least one action chain comprising actions executable to achieve the one or more goals in the at least one goal group.

6. The method of claim 3, wherein processing the extended FSM, the one or more goals and the one or more action chains further comprises determining that no goal of at least one primary goal group appears in any trace and, in response, indicating that at least one action chain of the one or more action chains is invalid, the at least one action chain comprising actions executable to achieve the one or more goals in the at least one primary goal group.

7. The method of claim 2, wherein each state is associated with a status vector, the status vector being defined as a ordered set of variable values.

8. The method of claim 2, wherein each transition is associated with an action that can be performed to change a status vector.

9. The method of claim 2, wherein the extended SAM schema represents constraints on actions that can be performed to transition between states.

10. The method of claim 1, wherein each action chain of the one or more action chains comprises one of a hard action chain, a soft action chain, and a mixed action chain.

11. The method of claim 10, wherein at least one action chain comprises at least one hard action and at least one soft action.

12. The method of claim 11, wherein a hard action comprises an action that, if disallowed, results in halting execution of another action or logic in the at least one action chain.

13. The method of claim 11, wherein a soft action comprises an action that, even if disallowed, execution of another action or logic in the at least one action chain continues.

14. The method of claim 1, wherein the core SAM schema is associated to a business process.

15. The method of claim 1, wherein the extended SAM schema is provided based on a business object (BO) extension that points to a core BO, the BO extension comprising business object node (BON) extensions, each BON extension pointing to a respective BON of the core BO.

16. A non-transitory computer-readable storage medium coupled to one or more processors and having instructions stored thereon which, when executed by the one or more processors, cause the one or more processors to perform operations for evaluating a validity of an extended status and action management (SAM) schema, the operations comprising:
receiving the extended SAM schema, the extended SAM schema, the extended SAM schema being stored as a computer-readable document in memory and being an extension of a core SAM schema that defines constraints of a data object comprising a plurality of data object nodes and defines transitions of status vectors for each of the plurality of data object nodes based on preconditions of the status vectors and based on actions that are performed on a corresponding data object node of the plurality of data object nodes, each of the plurality of data object nodes comprising a plurality of possible status variables corresponding to a plurality of milestones in a lifecycle of respective object node;
providing one or more goals, each of the one or more goals being defined as one of a primary goal indicating a desired outcome of the core SAM schema and a recovery goal indicating an acceptable outcome of the core SAM schema, both the primary goal and the recovery goal being included in the core SAM schema and the one or more goals comprising achievable states defined as respective state vectors and being provided in the computer-readable document stored in memory;
receiving one or more action chains, the one or more action chains representing one or more actions of the extended SAM schema that are to be automatically executed, the one or more action chains being provided in the computer-readable document stored in memory, the one or more actions being associated with triggerability flags, a triggerability flag indicating whether a respective action is only triggerable using a respective action chain; and
processing the one or more goals, the one or more action chains and the triggerability flags against the achievable states using a computer-executable model checking tool for evaluating the validity of the extended SAM schema by determining whether the extended SAM schema correctly fulfills an intention, for which the core SAM schema is provided, correctly fulfilling the intention depending on reachability of each of the one or more goals from an initial status vector associated with the extension of the core SAM schema.

17. A system, comprising:
a computing device; and
a computer-readable storage device coupled to the computing device and having instructions stored thereon which, when executed by the computing device, cause the computing device to perform operations for evaluating a validity of an extended status and action management (SAM) schema, the operations comprising:
receiving the extended SAM schema, the extended SAM schema, the extended SAM schema being stored as a computer-readable document in memory and being an extension of a core SAM schema that defines constraints of a data object comprising a plurality of data object nodes and defines transitions of status vectors for each of the plurality of data object nodes based on preconditions of the status vectors and based on actions that are performed on a corresponding data object node of the plurality of data object nodes, each of the plurality of data object nodes comprising a plurality of possible status variables corresponding to a plurality of milestones in a lifecycle of respective object node;
providing one or more goals, each of the one or more goals being defined as one of a primary goal indicating a desired outcome of the core SAM schema and a recovery goal indicating an acceptable outcome of the core SAM schema, both the primary goal and the recovery goal being included in the core SAM schema and the one or more goals comprising achievable states defined as respective state vectors and being provided in the computer-readable document stored in memory;
receiving one or more action chains, the one or more action chains representing one or more actions of the extended SAM schema that are to be automatically executed, the one or more action chains being provided in the computer-readable document stored in memory, the one or more actions being associated with triggerability flags, a triggerability flag indicating whether a respective action is only triggerable using a respective action chain; and
processing the one or more goals, the one or more action chains and the triggerability flags against the achievable states using a computer-executable model checking tool for evaluating the validity of the extended SAM schema by determining whether the extended SAM schema correctly fulfills an intention, for which the core SAM schema is provided, correctly fulfilling the intention depending on reachability of each of the one or more goals from an initial status vector associated with the extension of the core SAM schema.

* * * * *